United States Patent
Stegemann et al.

(10) Patent No.: US 12,058,352 B2
(45) Date of Patent: Aug. 6, 2024

(54) VIDEO DECODER, VIDEO ENCODER, METHOD FOR DECODING A VIDEO CONTENT, METHOD FOR ENCODING A VIDEO CONTENT, COMPUTER PROGRAM AND VIDEO BITSTREAM

(71) Applicant: Fraunhofer-Gesellschaft zur Förderung der angewandten Forschung e. V., Munich (DE)

(72) Inventors: Jan Stegemann, Berlin (DE); Heiner Kirchhoffer, Berlin (DE); Detlev Marpe, Berlin (DE); Heiko Schwarz, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 146 days.

(21) Appl. No.: 17/900,402

(22) Filed: Aug. 31, 2022

(65) Prior Publication Data
US 2022/0417538 A1 Dec. 29, 2022

Related U.S. Application Data

(63) Continuation of application No. 17/036,777, filed on Sep. 29, 2020, now Pat. No. 11,457,230, which is a
(Continued)

(51) Int. Cl.
*H04N 19/119* (2014.01)
*H04N 19/13* (2014.01)
(Continued)

(52) U.S. Cl.
CPC ......... *H04N 19/189* (2014.11); *H04N 19/119* (2014.11); *H04N 19/13* (2014.11);
(Continued)

(58) Field of Classification Search
CPC .... H04N 19/189; H04N 19/119; H04N 19/13; H04N 19/159; H04N 19/176
See application file for complete search history.

(56) References Cited

U.S. PATENT DOCUMENTS

| | | |
|---|---|---|
| 2016/0353110 A1 | 12/2016 | Chen et al. |
| 2018/0205953 A1 | 7/2018 | George |

(Continued)

FOREIGN PATENT DOCUMENTS

| | | |
|---|---|---|
| KR | 10-2018-0013927 | 2/2018 |
| WO | WO 2016/196307 A1 | 12/2016 |

OTHER PUBLICATIONS

Korean Office Action mailed Jul. 21, 2022 in KR application 10-2020-7031124.
(Continued)

*Primary Examiner* — Dave Czekaj
*Assistant Examiner* — Berteau Joisil
(74) *Attorney, Agent, or Firm* — NIXON & VANDERHYE P.C.

(57) ABSTRACT

A video decoder is configured to decode a plurality of video frames which are subdivided into a set of one or more slices. The decoder evaluates slice type information indicating whether a slice is encoded using an independent coding mode having no prediction of video content of a current frame on the basis of a video content of a previous frame, or using a single-predictive mode having a prediction of a block of pixels on the basis of one block of pixels of a previous frame, or using a bi-predictive mode having a prediction of a block of pixels on the basis of two or more
(Continued)

blocks of pixels of one or more previous frames, to select a mode of operation for decoding a slice. The video decoder includes an arithmetic decoder for providing a decoded binary sequence on the basis of an encoded representation of the binary sequence.

30 Claims, 8 Drawing Sheets

Related U.S. Application Data continuation of application No. PCT/EP2019/058057, filed on Mar. 29, 2019.

(51) Int. Cl.
  *H04N 19/159* (2014.01)
  *H04N 19/176* (2014.01)
  *H04N 19/189* (2014.01)
  *H04N 19/46* (2014.01)
(52) U.S. Cl.
  CPC ......... *H04N 19/159* (2014.11); *H04N 19/176* (2014.11); *H04N 19/46* (2014.11)

(56) References Cited

U.S. PATENT DOCUMENTS

2018/0270500 A1  9/2018  Li
2021/0014512 A1  1/2021  Stegemann et al.

OTHER PUBLICATIONS

A. Alshin et al.,"Multi-parameter probability update for CABAC", Joint Collaborative Team on Video Coding (JCT-VC) of ITU-T SG16 WP3 and ISO/IEC JTC1/SC29/WG11, JCTVC-F254, 6th Meeting: Torino, IT, Jul. 14-22, 2011, pp. 1-5.

A. Alshin et al., "CE1 (subset B): Multi-parameter probability up-date for CABAC", Joint Collaborative Team on Video Coding (JCT-VC) of ITU-T SG16 WP3 and ISO/IEC JTC1/SC29/WG11, JCTVC-G764, 7th Meeting: Geneva, CH, Nov. 2011, pp. 1-4.

Amir Said et al., "Arithmetic coding with context-dependent double-window adaptation response", Joint Video Exploration Team (JVET) of ITU-T SG 16 WP 3 and ISO/IEC JTC 1/SC 29/WG 11, JVET-G0112, 7th Meeting: Torino, IT, Jul. 13-21, 2017, pp. 1-4.

Amir Said et al., EE2 related: "Arithmetic coding with progressive context-dependent double-window adaptation response", Joint Video Exploration Team (JVET) of ITU-T SG 16 WP 3 and ISO/IEC JTC 1/SC 29/WG 11, JVET-H0067, 8th Meeting: Macao, CN, Oct. 18-24, 2017, pp. 1-9.

M. Albrecht et al., "Description of SDR, HDR, and 360 video coding technology proposal by Fraunhofer HHI", Joint Video Experts Team (JVET) of ITU-T SG 16 WP 3 and ISO/IEC JTC 1/SC 29/WG 11, JVET-J0014-v4, 10th Meeting: San Diego, US, Apr. 10-20, 2018, pp. 18-20.

Kenji Iwai, "Office Action for JP Applicatin No. 2020-552198", Nov. 11, 2021, JPO, Japan.

ITU-T, Recommendation H.265 (Dec. 2016), https://www.itu.int/rec/dologin_pub.asp?lang=e&id=T-REC-H.265-201612-1!!PDF-E &type=items.

J. Stegemann et al., Non-CE1: Counter-based probability model update with adapted arithmetic coding engine, http://phenix.it-sudparis.eu/jct/doc_end_user/documents/7_Geneva/wg11/JCTVC-G547-v4.zip.

A. Said et al., EE2: Arithmetic coding with context-dependent double-window adaptation response, JVET-H0061, http://phenix.it-sudparis.eu/jvet/doc_end_user/documents/8_Macaulwg11/JVET-H0061_-v1.zip.

Alexander Alshin et al., CE1 (subset B): Multi-parameter probability up-date for CABAC, 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itiu.int/av-arch/jctvc-site/., (20111109), No. JCTVC-G764, XPO30110748.

400

```
┌─────────────────────────────────────────────────────────────────────┐
│ Decoding a plurality of video frames, wherein a video frame which   │
│ is subdivided into a set of one or more slices is decoded,          │
│                                                                     │
│ ┌─────────────────────────────────────────────────────────────────┐ │
│ │ Evaluating a slice type information indicating whether a slice  │ │
│ │ is encoded using an independent coding mode, in which there is  │ │
│ │ no prediction of video content of a current frame on the basis  │ │
│ │ of a video content of a previous frame, or using a single-      │ │
│ │ predictive mode in which there is a prediction of a block of    │ │
│ │ pixels on the basis of one block of pixels of a previous frame, │ │
│ │ or using a bi- predictive mode in which there is a prediction   │ │
│ │ of a block of pixels on the basis of two blocks of pixels of    │ │
│ │ one or more previous frames, to select a mode of operation for  │ │
│ │ a decoding of a slice. (optional)                               │ │
│ └─────────────────────────────────────────────────────────────────┘ │
│                                                                     │
│ ┌─────────────────────────────────────────────────────────────────┐ │
│ │   Providing an decoded binary sequence on the basis             │ │
│ │   of an encoded representation of the binary sequence,          │ │
│ │                                                                 │ │
│ │ ┌─────────────────────────────────────────────────────────────┐ │ │
│ │ │ Determining a first source statistic value ($a_t$) using a  │ │ │
│ │ │ first window size ($w_a$) and determining a second source   │ │ │
│ │ │ statistic value ($b_t$) using a second window size ($w_b$)  │ │ │
│ │ │ [optional]                                                  │ │ │
│ │ └─────────────────────────────────────────────────────────────┘ │ │
│ │                              ↓                                  │ │
│ │ ┌─────────────────────────────────────────────────────────────┐ │ │
│ │ │ Determining a combined source statistic value               │ │ │
│ │ │ ($\tilde{c}_t, \tilde{c}'_t, p_t$) on the basis of the      │ │ │
│ │ │ first source statistic value ($a_t$) and on the basis of    │ │ │
│ │ │ the second source statistic value ($b_t$)                   │ │ │
│ │ │                                                             │ │ │
│ │ │ [alternatively: determining a combined source statistic     │ │ │
│ │ │ value ($\tilde{c}_t, \tilde{c}'_t, p_t$), wherein the first │ │ │
│ │ │ source statistic value ($a_t$) is combined with a fixed     │ │ │
│ │ │ non-zero value in order to obtain the combined source       │ │ │
│ │ │ statistic value]                                            │ │ │
│ │ └─────────────────────────────────────────────────────────────┘ │ │
│ │                              ↓                                  │ │
│ │ ┌─────────────────────────────────────────────────────────────┐ │ │
│ │ │ Determining one or more range values for an interval        │ │ │
│ │ │ subdivision, which is used for a mapping of the the encoded │ │ │
│ │ │ representation of the binary sequence onto the decoded      │ │ │
│ │ │ binary sequence, on the basis of the combined source        │ │ │
│ │ │ statistic value.                                            │ │ │
│ │ └─────────────────────────────────────────────────────────────┘ │ │
│ └─────────────────────────────────────────────────────────────────┘ │
└─────────────────────────────────────────────────────────────────────┘
```

Wherein the method comprises encoding a plurality of video frames, wherein a video frame which is subdivided into a set of one or more slices is encoded Providing slice type information indicating whether a slice is encoded using an independent coding mode, in which there is no prediction of video content of a current frame on the basis of a video content of a previous frame, or using a single-predictive mode in which there is a prediction of a block of pixels on the basis of one block of pixels of a previous frame, or using a bi-predictive mode in which there is a prediction of a block of pixels on the basis of two blocks of pixels of one or more previous frames (optional)

Providing an encoded representation of a binary sequence on the basis of the binary sequence, Determining a first source statistic value ($a_t$) using a first window size ($w_a$) and determining a second source statistic value ($b_t$) using a second window size ($w_b$) [optional]

↓

Determining a combined source statistic value ($\tilde{c}_t, \tilde{c}'_t, p_t$) on the basis of the first source statistic value ($a_t$) and on the basis of the second source statistic value ($b_t$)

[alternatively: determining a combined source statistic value ($\tilde{c}_t, \tilde{c}'_t, p_t$), wherein the first source statistic value ($a_t$) is combined with a fixed non-zero value in order to obtain the combined source statistic value]

↓

Determining one or more range values for an interval subdivision, which is used for a mapping of the binary sequence onto the encoded representation of the binary sequence, on the basis of the combined source statistic value

Fig. 5

Fig. 7A  Table 1: bitmask of 8-bit variable $ws_{pair}$
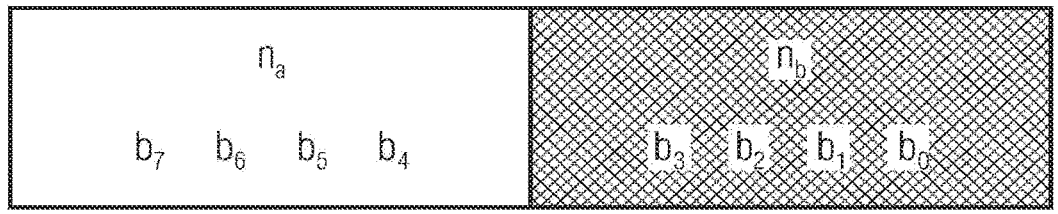
Fig. 7B  Table 2: assignment of $ws_{pair}$ values
| SliceType | cabac init flag | $ws_{pair}$ |
|---|---|---|
| B | 0 | $ws_{pair0}$ |
| B | 1 | $ws_{pair1}$ |
| P | 0 | $ws_{pair1}$ |
| P | 1 | $ws_{pair0}$ |
| Intra | 0 | $ws_{pair2}$ |
Fig. 7C  Table 3: assignment of $ws_{pair}$ values dependent on ws_flag
| SliceType | ws_flag | $ws_{pair}$ |
|---|---|---|
| B | 0 | $ws_{pair0}$ |
| B | 1 | $ws_{pair1}$ |
| P | 0 | $ws_{pair2}$ |
| P | 1 | $ws_{pair3}$ |
| Intra | 0 | $ws_{pair4}$ |
| Intra | 1 | $ws_{pair5}$ |

//  # VIDEO DECODER, VIDEO ENCODER, METHOD FOR DECODING A VIDEO CONTENT, METHOD FOR ENCODING A VIDEO CONTENT, COMPUTER PROGRAM AND VIDEO BITSTREAM

CROSS-REFERENCE TO RELATED APPLICATIONS

This application is a continuation of U.S. patent application Ser. No. 17/036,777, filed Sep. 29, 2020 (pending), which is a continuation of copending International Application No. PCT/EP2019/058057, filed Mar. 29, 2019, and additionally claims priority from European Application No. EP 18165250.4, filed Mar. 29, 2018, each of which is incorporated herein by reference in their entirety.

Embodiments according to the invention are related to video decoders, video encoders, methods for decoding a video content, methods for encoding a video content, computer programs and video bitstreams.

An embodiment according to the invention is related to a probability estimation method for binary arithmetic coding, which can be used, for example, in video encoders, video decoders but also in image encoders, image decoders, audio encoders, audio decoders and the like.

BACKGROUND OF THE INVENTION

Arithmetic encoding and decoding has proven to be a valuable tool in the encoding and decoding of audio and video contents. For example, it is possible to exploit known occurrence probabilities of binary values in a binary sequence representing a video or audio content to increase encoding efficiency. In particular arithmetic encoding can deal with varying probabilities of "0"s and "1"s in an efficient manner, and can adapt to changes of the probabilities in a fine-tuned manner.

However, for arithmetic encoding and decoding to bring an optimal coding efficiency, it is important to have a good information about the probabilities of "0"s and "1"s which well reflects an actual frequency of occurrence. The knowledge about the probabilities of "0"s and "1"s (or generally, about probabilities of the symbols to be encoded) is typically used to adjust boundaries of intervals within a total range of values, to obtain an interval sub-division (for example, such that a full range of values is sub-divided into intervals associated with different binary values or groups of binary values).

Accordingly, there is a need for concepts for the determination of source statistic values, or range values for the interval sub-division, which provide a good tradeoff between computational efficiency and reliability.

SUMMARY

An embodiment may have a video decoder, wherein the video decoder is configured to decode a plurality of video frames, wherein the video decoder is configured to decode a video frame which is subdivided into a set of one or more slices, wherein the video decoder is configured to evaluate an slice type information indicating whether a slice is encoded using an independent coding mode, in which there is no prediction of video content of a current frame on the basis of a video content of a previous frame, or using a single-predictive mode in which there is a prediction of a block of pixels on the basis of one block of pixels of a previous frame, or using a bi-predictive mode in which there is a prediction of a block of pixels on the basis of two or more blocks of pixels of one or more previous frames, to select a mode of operation for a decoding of a slice; wherein the video decoder includes an arithmetic decoder for providing wherein the arithmetic decoder is configured to determine a first source statistic value using a first estimation parameter and to determine a second source statistic value using a second estimation parameter, and wherein the arithmetic decoder is configured to determine a combined source statistic value on the basis of the first source statistic value and on the basis of the second source statistic value, and wherein the arithmetic decoder is configured to determine one or more range values for an interval subdivision, which is used for a mapping of the encoded representation of the binary sequence onto the decoded binary sequence, on the basis of the combined source statistic value.

Another embodiment may have a video decoder, wherein the video decoder is configured to decode a plurality of video frames, wherein the video decoder is configured to decode a video frame which is subdivided into a set of one or more slices, wherein the video decoder is configured to evaluate an slice type information indicating whether a slice is encoded using an independent coding mode, in which there is no prediction of video content of a current frame on the basis of a video content of a previous frame, or using a single-predictive mode in which there is a prediction of a block of pixels on the basis of one block of pixels of a previous frame, or using a bi-predictive mode in which there is a prediction of a block of pixels on the basis of two or more blocks of pixels of one or more previous frames, to select a mode of operation for a decoding of a slice; wherein the video decoder includes an arithmetic decoder for providing a decoded binary sequence on the basis of an encoded representation of the binary sequence, wherein the arithmetic decoder is configured to determine a first source statistic value using a first estimation parameter, and wherein the arithmetic decoder is configured to determine a combined source statistic value, wherein the arithmetic decoder is configured to combine the first source statistic value with a fixed non-zero value in order to obtain the combined source statistic value, and wherein the arithmetic decoder is configured to determine one or more range values for an interval subdivision, which is used for a mapping of the encoded representation of the binary sequence onto the decoded binary sequence, on the basis of the combined source statistic value.

Another embodiment may have a video encoder, wherein the video encoder is configured to encode a plurality of video frames, wherein the video encoder is configured to encode a video frame which is subdivided into a set of one or more slices, wherein the video encoder is configured to provide an slice type information indicating whether a slice is encoded using an independent coding mode, in which there is no prediction of video content of a current frame on the basis of a video content of a previous frame, or using a single-predictive mode in which there is a prediction of a block of pixels on the basis of one block of pixels of a previous frame, or using a bi-predictive mode in which there is a prediction of a block of pixels on the basis of two or more blocks of pixels of one or more previous frames; wherein the video encoder includes an arithmetic encoder for providing an encoded representation of a binary sequence on the basis of the binary sequence, wherein the arithmetic encoder is configured to determine a first source statistic value using a first estimation parameter and to determine a second source statistic value using a second estimation parameter, and wherein the arithmetic encoder is configured to determine a combined source statistic value on the basis of the first source statistic value and on the basis of the second source statistic value, and wherein the arithmetic encoder is configured to determine one or more range values for an interval subdivision, which is used for a mapping of the binary sequence onto the encoded representation of the binary sequence, on the basis of the combined source statistic value.

Another embodiment may have a video encoder, wherein the video encoder is configured to encode a plurality of video frames, wherein the video encoder is configured to encode a video frame which is subdivided into a set of one or more slices, wherein the video encoder is configured to provide an slice type information indicating whether a slice is encoded using an independent coding mode, in which there is no prediction of video content of a current frame on the basis of a video content of a previous frame, or using a single-predictive mode in which there is a prediction of a block of pixels on the basis of one block of pixels of a previous frame, or using a bi-predictive mode in which there is a prediction of a block of pixels on the basis of two or more blocks of pixels of one or more previous frames; wherein the video encoder includes an arithmetic encoder for providing an encoded representation of a binary sequence on the basis of the binary sequence, wherein the arithmetic encoder is configured to determine a first source statistic value using a first estimation parameter, and wherein the arithmetic encoder is configured to determine a combined source statistic value, wherein the arithmetic encoder is configured to combine the first source statistic value with a fixed non-zero value in order to obtain the combined source statistic value, and wherein the arithmetic encoder is configured to determine one or more range values for an interval subdivision, which is used for a mapping of the binary sequence onto the encoded representation of the binary sequence, on the basis of the combined source statistic value.

Another embodiment may have a method for decoding a video content, wherein the method includes decoding a plurality of video frames, wherein the method includes decoding a video frame which is subdivided into a set of one or more slices, wherein the method includes evaluating a slice type information indicating whether a slice is encoded using an independent coding mode, in which there is no prediction of video content of a current frame on the basis of a video content of a previous frame, or using a single-predictive mode in which there is a prediction of a block of pixels on the basis of one block of pixels of a previous frame, or using a bi-predictive mode in which there is a prediction of a block of pixels on the basis of two blocks of pixels of one or more previous frames, to select a mode of operation for a decoding of a slice; wherein the method includes providing a decoded binary sequence on the basis of an encoded representation of the binary sequence, wherein the method includes determining a first source statistic value using a first estimation parameter and determining a second source statistic value using a second estimation parameter, and wherein the method includes determining a combined source statistic value on the basis of the first source statistic value and on the basis of the second source statistic value, and wherein the method includes determining one or more range values for an interval subdivision, which is used for a mapping of the encoded representation of the binary sequence onto the decoded binary sequence, on the basis of the combined source statistic value.

Another embodiment may have a method for decoding a video content, wherein the method includes decoding a plurality of video frames, wherein the method includes decoding a video frame which is subdivided into a set of one or more slices, wherein the method includes evaluating a slice type information indicating whether a slice is encoded using an independent coding mode, in which there is no prediction of video content of a current frame on the basis of a video content of a previous frame, or using a single-predictive mode in which there is a prediction of a block of pixels on the basis of one block of pixels of a previous frame, or using a bi-predictive mode in which there is a prediction of a block of pixels on the basis of two blocks of pixels of one or more previous frames, to select a mode of operation for a decoding of a slice; wherein the method includes providing a decoded binary sequence on the basis of an encoded representation of the binary sequence, wherein the method includes determining a first source statistic value using a first estimation parameter, and wherein the method includes determining a combined source statistic value, wherein the first source statistic value is combined with a fixed non-zero value in order to obtain the combined source statistic value, and wherein the method includes determining one or more range values for an interval subdivision, which is used for a mapping of the encoded representation of the binary sequence onto the decoded binary sequence, on the basis of the combined source statistic value.

Another embodiment may have a method for encoding a video content, wherein the method includes encoding a plurality of video frames, wherein the method includes encoding a video frame which is subdivided into a set of one or more slices, wherein the video method includes providing slice type information indicating whether a slice is encoded using an independent coding mode, in which there is no prediction of video content of a current frame on the basis of a video content of a previous frame, or using a single-predictive mode in which there is a prediction of a block of pixels on the basis of one block of pixels of a previous frame, or using a bi-predictive mode in which there is a prediction of a block of pixels on the basis of two blocks of pixels of one or more previous frames; wherein the method includes providing an encoded representation of a binary sequence on the basis of the binary sequence, wherein the method includes determining a first source statistic value using a first estimation parameter and determining a second source statistic value using a second estimation parameter, and wherein the method includes determining a combined source statistic value on the basis of the first source statistic value and on the basis of the second source statistic value, and wherein the method includes determining one or more range values for an interval subdivision, which is used for a mapping of the binary sequence onto the encoded representation of the binary sequence, on the basis of the combined source statistic value.

Another embodiment may have a method for encoding a video content, wherein the method includes encoding a plurality of video frames, wherein the method includes encoding a video frame which is subdivided into a set of one or more slices, wherein the method includes providing a slice type information indicating whether a slice is encoded using an independent coding mode, in which there is no prediction of video content of a current frame on the basis of a video content of a previous frame, or using a single-predictive mode in which there is a prediction of a block of pixels on the basis of one block of pixels of a previous frame, or using a bi-predictive mode in which there is a prediction of a block of pixels on the basis of two blocks of pixels of one or more previous frames; wherein the method includes providing an encoded representation of a binary sequence on the basis of the binary sequence, wherein the method includes determining a first source statistic value using a first estimation parameter, and wherein the method includes determining a combined source statistic value, wherein the first source statistic value is combined with a fixed non-zero value in order to obtain the combined source statistic value, and wherein the method includes determining one or more range values for an interval subdivision, which is used for a mapping of the binary sequence onto the encoded representation of the binary sequence, on the basis of the combined source statistic value.

Another embodiment may have a non-transitory digital storage medium having a computer program stored thereon to perform the inventive methods when said computer program is run by a computer.

An embodiment according to the invention creates a video decoder, wherein the video decoder is configured to decode a plurality of video frames (for example, a sequence of video frames).

The video decoder is configured to decode a video frame which is subdivided into a set of one or more slices (advantageously a plurality of slices), wherein the video decoder is configured to evaluate an slice type information (e.g. "SliceType") indicating whether a slice is encoded using an independent coding mode (e.g. "Intra"), in which there is no prediction of video content of a current frame on the basis of a video content of a previous frame, or using a single-predictive mode (e.g. "P") in which there is a prediction of a block of pixels on the basis of one block (e.g. only one block) of pixels of a previous frame (e.g. a previously decoded frame), or using a bi-predictive mode (e.g. "B") in which there is a prediction of a block of pixels on the basis of two or more blocks of pixels of one or more previous frames (e.g. previously decoded frames), to select a mode of operation for a decoding of a slice. The video decoder comprises an arithmetic decoder for providing a decoded binary sequence (for example, describing a transform coefficient of an image content) on the basis of an encoded representation of the binary sequence. The arithmetic decoder is configured to determine a first source statistic value (e.g. $a_t$) (which is, for example, based on a frequency of previously decoded binary values $x_{t-1}, x_{t-2}, \ldots$) (and which is, for example, also designated as a "counter variable" or "counter") using a first window size (e.g. $w_a$) (which may, for example, be represented by a window size variable), for example, on the basis of a previously decoded binary sequence, and to determine a second source statistic value (e.g. $b_t$) (which is based on a frequency of previously decoded binary values $x_{t-1}, x_{t-2}, \ldots$) using a second window size (e.g. $w_b$), for example, on the basis of the previously decoded binary sequence. The arithmetic decoder is, for example, configured to determine a combined source statistic value (e.g. $\tilde{c}_t$ or $\tilde{c}'_t$ or $p_t$) on the basis of the first source statistic value (e.g. $a_t$) and on the basis of the second source statistic value (e.g. $b_t$). The arithmetic decoder is configured to determine one or more range values for an interval subdivision, which is used for a mapping of the encoded representation of the binary sequence onto the decoded binary sequence, on the basis of the combined source statistic value.

In an embodiment of the video decoder, the arithmetic decoder is configured determine the first window size and the second window size in dependence on the slice type information (for example, to take different values, wherein the first window size and the second window size may, for example lie within a range between 1 and 11, including 1 and 11).

In an embodiment of the video decoder, the video decoder is configured to determine the first window size and the second window size also in dependence on an initialization parameter or flag (for example, a "cabac init flag") included in the bitstream (for example, one initialization flag per slice), wherein the initialization flag may, optionally also define initialization values for the first source statistic value and/or the second source statistic value.

In an embodiment of the video decoder, the video decoder is configured to determine the first window size and the second window size also in dependence on a context model (e.g. in dependence on which type of information is to be decoded, for example whether one or more most significant bits of a transform coefficient or one or more less significant bits of a transform coefficient are to be decoded). For example, a pair of window size values, defining the first window size and the second window size, may be predefined for each combination of slice type, initialization flag and context model.

In an embodiment, the video decoder is configured to selectively add a predetermined value (e.g. $((1 \ll BITS_a) - k_a) \gg n_a$ or $(ONE_a \gg n_a)$) to a previously computed instance (e.g. $a_t$) of the first source statistic value in dependence on a previously decoded binary value (e.g. $x_t$)) and to subtract a scaled version of the previously computed instance of the first source statistic value (e.g. $(a_t \gg n_a)$), in order to obtain an updated version $(a_{t+1})$ of the first source statistic value. Alternatively or in addition, the video decoder is configured to selectively add a predetermined value (e.g. $((1 \ll BITS_b) - k_b) \gg n_b$ or $(ONE_b \gg n_b)$) to a previously computed instance (e.g. $b_t$) of the second source statistic value in dependence on a previously decoded binary value (e.g. $x_t$)) and to subtract a scaled version of the previously computed instance of the second source statistic value (e.g. $(b_t \gg n_b)$), in order to obtain an updated version (e.g. $b_{t+1}$) of the second source statistic value.

In an embodiment, the video decoder is configured to obtain an updated version $a_{t+1}$ of the first source statistic value according to $$a_{t+1} = a_t + x_t \cdot (ONE_a \gg n_a) - (a_t \gg n_a)$$

wherein $a_t$ is a previously computed version of the first source statistic value, wherein $x_t$ is a previously decoded binary value (e.g. binary symbol taking values of 0 or 1), wherein $n_a$ is a window size information (e.g. having integer values), wherein $$ONE_a = (1 \ll BITS_a) - k_a$$

wherein BITSa is a number of bits used to represent the first source statistic value, wherein $k_a$ is a predetermined number (e.g. an integer number, e.g. 0 or 1).

Alternatively or in addition, the video decoder is configured to obtain an updated version $b_{t+1}$ of the second source statistic value according to $$b_{t+1} = b_t + x_t \cdot (ONE_b \gg n_b) - (b_t \gg n_b)$$

wherein $b_t$ is a previously computed version of the second source statistic value, wherein $x_t$ is a previously decoded symbol (e.g. binary symbol taking values of 0 or 1), wherein $n_b$ is a window size information (e.g. having integer values), wherein $$ONE_b = (1 \ll BITS_b) - k_b$$

wherein $BITS_b$ is a number of bits used to represent the second source statistic value, wherein kb is a predetermined number (e.g. an integer number, e.g. 0 or 1).

In an embodiment, $k_a=1$ and/or $k_b=1$.

In an embodiment of the video decoder, the video decoder is configured to determine the first source statistic value $a_{t+1}$ according to $$a_{t+1}=a_t(x_t\ll(BITS_a-n_a))-(a_t\gg n_a)$$

and $$a_{t+1}=a_{t+1}-(a_{t+1}\gg BITS_a)$$

wherein $a_t$ is a previously computed source statistic value, $x_t$ is a previously decoded binary value, $BITS_a$ is a number of bits allocated for the first source statistic value, $n_a$ represents the first window size $w_a$, wherein $w_a=2^{n_a}$, and ">>" is a shift-to-the right operator, and/or wherein the video decoder is configured to determine the second source statistic value $b_{t+1}$ according to $$b_{t+1}=b_t(x_t\ll(BITS_b-n_b))-(b_t\gg a_b)$$

and $$b_{t+1}=b_{t+1}-(b_{t+1}\gg BITS_b)$$

wherein $b_t$ is a previously computed source statistic value, $x_t$ is a previously decoded binary value, $BITS_b$ is a number of bits allocated for the first source statistic value, $n_b$ represents the second window size $w_b$, wherein $w_b=2^{n_b}$.

Note that the update of the first and the second source statistic value only differs in the parameters $BITS_{a/b}$ and $n_{a/b}$. Until the end of this embodiment, a and $a_t$ shall be used to discuss the update procedure for both $a_t$ and $b_t$. In order to yield the update procedure for $b_t$, all occurrences of a simply need to be replaced by b in the below equations.

The update procedure can be rewritten as $$a_{t+1}=a_t+x_t(1\ll(BITS_a-n_a))-(a_t\gg n_a)$$

and $$a_{t+1}=a_{t+1}-(a_{t+1}\gg BITS_a)$$

which produce the exactly same result as the original update equations above. The first of the two above update equations can be rewritten as $$a_{t+1}=a_t+x_t(ONE_a\gg n_a)-(a_t\gg n_a)$$

where $$ONE_a=1\ll BITS_a.$$

Note that $ONE_a$ represents a probability value equal to 1. For an efficient implementation, it may be reasonable to quantize or slightly alter $ONE_a$ (e.g. by adding or subtracting small quantities). This has virtually no impact on the behavior of the source statistic values. For example, when using $$ONE_a=(1\ll BITS_a)-1,$$

the binary representation of $ONE_a$ needs one bit less than the original version. However, the behavior of the update of the source statistic values is virtually unchanged.

In an embodiment, the video decoder is configured to determine the first source statistic value $a_{t+1}$ according to $$a_{t+1}=a_t+(x_t\ll(BITS_a-n_a))-(a_t\gg n_a)$$

wherein $a_t$ is a previously computed source statistic value, $x_t$ is a previously decoded binary value, $BITS_a$ is a number of bits allocated for the first source statistic value, $n_a$ represents the first window size $w_a$, wherein $w_a=2^{n_a}$, and >> is a shift-to-the right operator.

Alternatively or in addition, the video decoder is configured to determine the second source statistic value $b_{t+1}$ according to $$b_{t+1}=b_t+(x_t\ll(BITS_b-n_b))-(b_t\gg n_b)$$

wherein $b_t$ is a previously computed source statistic value, $x_t$ is a previously decoded binary value, $BITS_b$ is a number of bits allocated for the first source statistic value, $n_b$ represents the second window size $w_b$, wherein $w_b=2^{n_b}$.

In an embodiment of the video decoder, the video decoder is configured to determine the first source statistic value $a_{t+1}$ according to $$a_{t+1}=\begin{cases}a_t+\left(\left(2^{BITS_a}-a_t\right)\gg n_a\right),&\text{if }x_t=1\\a_t-(a_t\gg n_a),&\text{if }x_t=0.\end{cases}$$

wherein $a_t$ is a previously computed source statistic value, $x_t$ is a previously decoded binary value, $BITS_a$ is a number of bits allocated for the first source statistic value, $n_a$ represents the first window size $w_a$, wherein $w_a=2^{n_a}$, and ">>" is a shift-to-the right operator, and/or the video decoder is configured to determine the second source statistic value $b_{t+1}$ according to $$b_{t+1}=\begin{cases}b_t+\left(\left(2^{BITS_b}-b_t\right)\gg n_b\right),&\text{if }x_t=1\\b_t-(b_t\gg n_b),&\text{if }x_t=0.\end{cases}$$

wherein $b_t$ is a previously computed source statistic value, $x_t$ is a previously decoded binary value, $BITS_b$ is a number of bits allocated for the first source statistic value, $n_b$ represents the second window size $w_b$, wherein $w_b=2^{n_b}$, and ">>" is a shift-to-the right operator.

In an embodiment of the video decoder, the video decoder is configured to combine the first source statistic value and the second source statistic value in order to obtain the combined source statistic value.

In an embodiment of the video decoder, the video decoder is configured to obtain the combined source statistic value $\tilde{c}_t$ according to $$\tilde{c}_t=(a_t+b_t)\gg 1$$

wherein $a_t$ is the first source statistic value, and wherein $b_t$ is the second source statistic value.

In an embodiment of the video decoder, the video decoder is configured to combine the first source statistic value and the second source statistic value in order to obtain the combined source statistic value, wherein different weights are associated with the first source statistic value and the second source statistic value (wherein, optionally, the video decoder is configured to change the weights during a decoding process).

In an embodiment of the video decoder, the video decoder is configured to use a different number of bits (e.g. $BITS_a$, $BITS_b$) for a representation of the first source statistic value (e.g. $a_t$) and of the second source statistic value (e.g. $b_t$).

In an embodiment of the video decoder, the video decoder is configured to use different window sizes for the first source statistic value (e.g. $a_t$) and for the second source statistic value (e.g. $b_t$) and wherein the video decoder is configured to use a comparatively larger number of bits for a representation of the source statistic value having a comparatively larger window size and to use a comparatively smaller number of bits for a representation of the source statistic value having a comparatively smaller window size.

In an embodiment of the video decoder, the video decoder is configured to modify number representations of the first source statistic value $a_t$ and/or of the second source statistic value $b_t$ according to $$a'_t = a_t >> (BITS_a - BITS_{min})$$

and/or according to $$b'_t = b_e >> (BITS_b - BITS_{min})$$

before determining the combined source statistic value, wherein $$BITS_{min} = \min(BITS_a, BITS_b),$$

wherein $BITS_a$ is a number of bits allocated for a representation of the first source statistic value and wherein $BITS_b$ is a number of bits allocated for a representation of the second source statistic value.

In an embodiment of the video decoder, the video decoder is configured to determine the combined source statistic value $\widetilde{c}_t$ according to $$\widetilde{c}_t = (a'_t + b'_t) >> 1,$$

and the video decoder is configured to derive an index value pStateIdx designating a table entry of a table comprising pre-calculated range values for the interval-subdivision according to $$p\text{StateIdx} = ((\widetilde{c}_t - 2^{(BITS_{min}-1)}) \text{XOR}(\text{valMPS}-1)) >> (BITS_{min} - BITS_{tabRes}),$$

wherein a value of a most-probable (e.g. binary) value is determined according to $$\text{valMPS} = \widetilde{c}_t >> (BITS_{min}-1),$$

wherein $BITS_{tabRes}$ describes a number of entries of the table (or a spacing, in terms of a frequency of the binary value, between entries of the table). The table describes, for example, a mapping of probability values within a range from 0 to 0.5 onto pre-calculated range values.

In an embodiment of the video decoder, the video decoder is configured to determine the combined source statistic value $\widetilde{c}_t$ according to $$\widetilde{c}_t = (a'_t + b'_t) >> 1,$$

and the video decoder is configured to derive an index value pStateIdx designating a table entry of a table comprising pre-calculated range values for the interval-subdivision according to $$p\text{StateIdx} = \widetilde{c}_t >> (BITS_{min} - BITS_{tabRes}),$$

wherein $BITS_{tabRes}$ describes a number of entries of the table (or a spacing, in terms of a frequency of the binary value, between entries of the table). The table describes, for example, a mapping of probability values within a range from 0 to 1 onto pre-calculated range values.

In an embodiment of the video decoder, the video decoder is configured to choose the number of bits (e.g. $BITS_a$, $BITS_b$) for a representation of the first source statistic value (e.g. $a_t$) and of the second source statistic value in dependence of the first window size and in dependence on the second window size (for example, according to $BITS_a = \text{ThrHd} + n_a$, wherein $w_a = 2^{n_a}$ or $n_a = \text{round}(\log_2 w_a)$, wherein round( ) is a rounding-up or rounding-down operator, and/or according to $BITS_b = \text{ThrHd} + n_b$, wherein $w_b = 2^{n_b}$ or $n_b = \text{round}(\log_2 w_b)$, and wherein ThrHd is a predetermined and fixed value).

In an embodiment of the video decoder, a sum of a total number of bits used for a representation of the first source statistic value ($a_t$) and of the second source statistic value ($b_t$) is constant over different context models (or independent in case of a variation of a number of bits used for the representation of the first source statistic value).

In an embodiment of the video decoder, the video decoder is configured to determine the first window size and the second window size also in dependence on an (for example, dedicated) initialization flag (for example, "ws_flag") included in the bitstream, and the video decoder is configured to set initialization values for the first source statistic value and/or the second source statistic value in dependence on another initialization flag (for example, a "cabac init flag") included in the bitstream.

In an embodiment of the video decoder, the video decoder or the arithmetic decoder is configured to determine the first window size and the second window size also in dependence on a temporal level of a current slice. Alternatively or in addition, the video decoder or the arithmetic decoder is configured determine the first window size and the second window size also in dependence on a quantization parameter of a current slice.

In an embodiment of the video decoder, the video decoder is configured to adjust the first window size and/or the second window size in dependence on a position (for example, in dependence on how many binary values have already decoded within the current slice, or since a context initialization, using the context model to which the first window size and/or the second window size are associated, or in dependence on a position of a pixel or of a block of pixels within a frame to which a binary value to be decoded is associated).

In an embodiment of the video decoder, the video decoder is configured to set the first window size and/or the second window size to a start value (which is smaller than a normal value) when decoding a binary value associated with a start position (e.g. a first row of a block of pixels, or a first column of a block of pixels), and to set the first window size and/or the second window size to a normal value (which is larger than the start value) when decoding a binary value which is associated with a position which is distanced from the start position by at least a predetermined position (or distance).

In an embodiment of the video decoder, the video decoder is configured to change the first window size and/or the second window size within a slice (e.g. when decoding a slice) in response to a signaling flag (e.g. a "ctu_ws_flag" flag) signaling that the window size should be changed.

In an embodiment of the video decoder, the video decoder is configured to evaluate, for a plurality of coding tree units (or even for all coding tree units), a signaling flag indicating whether the window size should be changed, and to increase or decrease at least one of the window sizes in dependence on the signaling flag (for example, to jointly increase or decrease all window sizes, even of different context models, by one in dependence on the signaling flag, keeping in mind not to exceed a maximum range of the window size). As an alternative example, it is possible to only increase or decrease window sizes of some of the context models.

In an embodiment of the video decoder, the video decoder is configured to derive a state index (e.g. pStateIdx) from the combined source statistic value (for example, $\tilde{c}_t$ or $\widetilde{c}_t$ or $p_t$), for example according to equation (8) or according to equation (12) or according to equation (14). Alternatively or in addition, the video decoder is configured to derive a value representing a most probable binary value or a least probable binary value (e.g. valMPS), for example according to equation (9) or according to equation (13). Moreover, the video decoder is configured to evaluate a table mapping the state index onto the one or more range values for the interval subdivision.

In an embodiment of the video decoder, the video decoder is configured to temporarily (for example, for the decoding of multiple binary values of the binary sequence, not only directly after an initialization) replace the second source statistic value by a constant replacement value, and to combine the first source statistic value (e.g. $a_t$) with the fixed non-zero replacement value in order to obtain the combined source statistic value.

In an embodiment of the video decoder, the video decoder is configured to choose the first window size $w_a$ and the second window size $w_b$ such that $n_a=n_b$ or $|n_a-n_b|\geq 3$, wherein $w_a=2^{n_a}$ or $n_a=\text{round}(\log_2 w_a)$, wherein round( ) is a rounding-up or rounding-down operator, and wherein $w_b=2^{n_b}$ or $n_b=\text{round}(\log_2 w_b)$.

In an embodiment, the video decoder is configured to choose the first window size $w_a$ and the second window size $w_b$ such that $|n_a-n_b|\geq 3$, wherein $w_a=2^{n_a}$ or $n_a=\text{round}(\log_2 w_a)$, wherein round( ) is a rounding-up or rounding-down operator, and wherein $w_b=2^{n_b}$ or $n_b=\text{round}(\log_2 w_b)$.

Another embodiment according to the invention creates a video decoder, wherein the video decoder is configured to decode a plurality of video frames (for example, a sequence of video frames), and wherein the video decoder is configured to decode a video frame which is subdivided into a set of one or more slices (advantageously a plurality of slices). The video decoder is configured to evaluate a slice type information (e.g. "SliceType") indicating whether a slice is encoded using an independent coding mode (e.g. "Intra"), in which there is no prediction of video content of a current frame on the basis of a video content of a previous frame, or using a single-predictive mode (e.g. "P") in which there is a prediction of a block of pixels on the basis of one block of pixels (for example, only one block of pixels) of a previous frame (for example a previously decoded frame), or using a bi-predictive mode ("B") in which there is a prediction of a block of pixels on the basis of two or more blocks of pixels of one or more previous frames (for example, previously decoded frame), to select a mode of operation for a decoding of a slice. The video decoder comprises an arithmetic decoder for providing a decoded binary sequence (for example, describing a transform coefficient of an image content) on the basis of an encoded representation of the binary sequence. The arithmetic decoder is configured to determine a first source statistic value (for example, $a_t$) (which may be based on a frequency of previously decoded binary values $x_{t-1}, x_{t-2}, \ldots$, and may also be designated as a "counter variable" or "counter") using a first window size (for example $w_a$), which may, for example, be represented by a window size variable. The arithmetic decoder may, for example, determine the first source statistic value on the basis of a previously decoded binary sequence. The arithmetic decoder is configured to determine a combined source statistic value (for example, $\tilde{c}_t$ or $\widetilde{c}_t$ or $p_t$), wherein the arithmetic decoder is configured to combine the first source statistic value (for example, $a_t$) with a fixed non-zero value in order to obtain the combined source statistic value, and the arithmetic decoder is configured to determine one or more range values for an interval subdivision, which is used for a mapping of the encoded representation of the binary sequence onto the decoded binary sequence, on the basis of the combined source statistic value.

This embodiment may be supplemented by any of the features, functionalities and details mentioned with respect to the embodiments discussed before, both individually and taken in combination.

An embodiment according to the invention creates a video encoder, wherein the video encoder is configured to encode a plurality of video frames (for example, a sequence of video frames), wherein the video encoder is configured to encode a video frame which is subdivided into a set of one or more slices (advantageously a plurality of slices). The video encoder is configured to provide a slice type information (for example, "SliceType") indicating whether a slice is encoded using an independent coding mode (for example, "Intra"), in which there is no prediction of video content of a current frame on the basis of a video content of a previous frame, or using a single-predictive mode (for example, "P") in which there is a prediction of a block of pixels on the basis of one block of pixels (for example, only one block of pixels) of a previous frame (for example, a previously encoded frame), or using a bi-predictive mode (for example, "B") in which there is a prediction of a block of pixels on the basis of two or more blocks of pixels of one or more previous frames (for example, previously encoded frames). The video encoder comprises an arithmetic encoder for providing an encoded representation of a binary sequence (for example, describing a transform coefficient of an image content) on the basis of the binary sequence (wherein the binary sequence may represent transform coefficients or spectral coefficients, or parameters, or any other information, for example information representing a content of a frame of the video content to be encoded). The arithmetic encoder is configured to determine a first source statistic value ($a_t$), which may, for example be based on a frequency of previously encoded binary values $x_{t-1}, x_{t-2}, \ldots$ and which may, for example, also be designated as a "counter variable" or "counter", using a first window size (for example, $w_a$) which may, for example, be represented by a window size variable. The video encoder may, for example determine the first source statistic value on the basis of a previously encoded binary sequence. The arithmetic encoder or the video encoder may be configured to determine a second source statistic value (for example, $b_t$), which may, for example, be based on a frequency of previously encoded binary values $x_{t-1}, x_{t-2}, \ldots$, using a second window size (for example, $w_b$). The arithmetic encoder or the video encoder may be configured to determine the second source statistic value, for example, on the basis of the previously encoded binary sequence. The arithmetic encoder is configured to determine a combined source statistic value (for example, $\tilde{c}_t$ or $\widetilde{c}_t$ or $p_t$) on the basis of the first source statistic value (for example, $a_t$) and on the basis of the second source statistic value (for example, b), and the arithmetic encoder is configured to determine one or more range values for an interval subdivision, which is used for a mapping of the binary sequence onto the encoded representation of the binary sequence, on the basis of the combined source statistic value.

In an embodiment, the video encoder (or, equivalently, the arithmetic encoder) is configured determine the first window size and the second window size in dependence on the slice type information (for example, two different values, wherein the first window size and the second window size may, for example lie within a range between 1 and 11, including 1 and 11).

In an embodiment of the video encoder, the video encoder is configured to provide an initialization parameter or flag (for example, a "cabac init flag" flag) and the video encoder is configured to determine the first window size and the second window size also in dependence on the initialization parameter or flag (for example, "cabac init flag"), which is included in a bitstream (for example, a bitstream representing the video frames) by the video encoder. For example, the video encoder provides one initialization flag per slice, wherein the initialization flag may, optionally also define initialization values for the first source statistic value and/or the second source statistic value.

In an embodiment of the video encoder, the video encoder is configured to determine the first window size and the second window size also in dependence on a context model (e.g. in dependence on which type of information is to be encoded, for example whether one or more most significant bits of a transform coefficient or one or more less significant bits of a transform coefficient are to be encoded). For example, a pair of window size values, defining the first window size and the second window size, may be predefined for each combination of slice type, initialization flag and context model.

In an embodiment, the video encoder is configured to selectively add a predetermined value (e.g. $((1 \ll BITS_a)-k_a) \gg n_a$ or $(ONE_a \gg n_a)$) to a previously computed instance (e.g. $a_t$) of the first source statistic value in dependence on a previously encoded binary value (e.g. $x_t$)) and to subtract a scaled version of the previously computed instance of the first source statistic value (e.g. $(a_t \gg n_a)$), in order to obtain an updated version ($a_{t+1}$) of the first source statistic value. Alternatively or in addition, the video encoder is configured to selectively add a predetermined value (e.g. $((1 \ll BITS_b)-k_b) \gg n_b$ or $(ONE_b \gg n_b)$) to a previously computed instance (e.g. $b_t$) of the second source statistic value in dependence on a previously encoded binary value (e.g. $x_t$)) and to subtract a scaled version of the previously computed instance of the second source statistic value (e.g. $(b_t \gg n_b)$), in order to obtain an updated version ($b_{t+1}$) of the second source statistic value.

In an embodiment, the video encoder is configured to obtain an updated version $a_{t+1}$ of the first source statistic value according to $$a_{t+1}=a_t+x_t \cdot (ONE_a \gg n_a)-(a_t \gg n_a)$$

wherein $a_t$ is a previously computed version of the first source statistic value, wherein $x_t$ is a previously encoded binary value (e.g. binary symbol taking values of 0 or 1), wherein $n_a$ is a window size information (e.g. having integer values), wherein $$ONE_a=(1 \ll BITS_a)-k_a$$

wherein BITSa is a number of bits used to represent the first source statistic value, wherein $k_a$ is a predetermined number (e.g. an integer number, e.g. 0 or 1).

Alternatively or in addition, the video encoder is configured to obtain an updated version $b_{t+1}$ of the second source statistic value according to $$b_{t+1}=b_t+x_t \cdot (ONE_b \gg n_b)-(b_t \gg n_b)$$

wherein $b_t$ is a previously computed version of the second source statistic value, wherein $x_t$ is a previously encoded symbol (e.g. binary symbol taking values of 0 or 1), wherein $n_b$ is a window size information (e.g. having integer values), wherein $$ONE_b=(1 \ll BITS_b)-k_b$$

wherein $BITS_b$ is a number of bits used to represent the second source statistic value, wherein kb is a predetermined number (e.g. an integer number, e.g. 0 or 1).

In an embodiment, $k_a=1$ and/or $k_b=1$;

In an embodiment of the video encoder, the video encoder is configured to determine the first source statistic value $a_{t+1}$ (for example, for an encoding of a value $x_{t+1}$) according to $$a_{t+1}=a_t+(x_t \ll (BITS_a-n_a))-(a_t \gg n_a)$$

and $$a_{t+1}=a_{t+1}-(a_{t+1} \gg BITS_a)$$

wherein $a_t$ is a previously computed source statistic value, $x_t$ is a previously encoded binary value, $BITS_a$ is a number of bits allocated for the first source statistic value, $n_a$ represents the first window size $w_a$, wherein $w_a=2^{n_a}$, and "$\gg$" is a shift-to-the right operator.

Alternatively or in addition, the video encoder may be configured to determine the second source statistic value $b_t+1$ according to $$b_{t+1}=b_t+(x_t \ll (BITS_b-n_b))-(b_t \gg n_b)$$

and $$b_{t+1}=b_{t+1}-(b_{t+1} \gg BITS_b)$$

wherein $b_t$ is a previously computed source statistic value, $x_t$ is a previously encoded binary value, $BITS_b$ is a number of bits allocated for the first source statistic value, $n_b$ represents the second window size $w_b$, wherein $w_b=2^{n_b}$.

In an embodiment, the video encoder is configured to determine the first source statistic value $a_{t+1}$ according to $$a_{t+1}=a_t+(x_t \ll (BITS_a-n_a))-(a_t \gg n_b)$$

wherein $a_t$ is a previously computed source statistic value, $x_t$ is a previously encoded binary value, $BITS_a$ is a number of bits allocated for the first source statistic value, $n_a$ represents the first window size $w_a$, wherein $w_a=2^{n_a}$, and $\gg$ is a shift-to-the right operator.

Alternatively or in addition, the video encoder is configured to determine the second source statistic value $b_t+_1$ according to $$b_{t+1}=b_t+(x_t \ll (BITS_b-n_b))-(b_t \gg n_b)$$

wherein $b_t$ is a previously computed source statistic value, $x_t$ is a previously encoded binary value, $BITS_b$ is a number of bits allocated for the first source statistic value, $n_b$ represents the second window size $w_b$, wherein $w_b=2^{n_b}$.

In an embodiment of the video encoder, the video encoder is configured to determine the first source statistic value $a_{t+1}$ according to $$a_{t+1} = \begin{cases} a_t + ((2^{BITS_a} - a_t) \gg n_a), & \text{if } x_t = 1 \\ a_t - (a_t \gg n_a), & \text{if } x_t = 0. \end{cases}$$

wherein $a_t$ is a previously computed source statistic value, $x_t$ is a previously encoded binary value, $BITS_a$ is a number of bits allocated for the first source statistic value, $n_a$ represents the first window size $w_a$, wherein $w_a=2^{n_a}$, and "$\gg$" is a shift-to-the right operator.

Alternatively or in addition, the video encoder may be configured to determine the second source statistic value $b_{t+1}$ according to $$b_{t+1} = \begin{cases} b_t + \left(\left(2^{BITS_b} - b_t\right) \gg n_b\right), & \text{if } x_t = 1 \\ b_t - (b_t \gg n_b), & \text{if } x_t = 0. \end{cases}$$

wherein $b_t$ is a previously computed source statistic value, $x_t$ is a previously encoded binary value, $BITS_b$ is a number of bits allocated for the first source statistic value, $n_b$ represents the second window size $w_b$, wherein $w_b = 2^{n_b}$, and ">>" is a shift-to-the right operator.

In an embodiment of the video encoder, the video encoder is configured to combine the first source statistic value and the second source statistic value in order to obtain the combined source statistic value.

In an embodiment of the video encoder, the video encoder is configured to obtain the combined source statistic value $\tilde{c}_t$ according to $$\tilde{c}_t = (a_t + b_t) \gg 1$$

wherein $a_t$ is the first source statistic value, and wherein $b_t$ is the second source statistic value.

In an embodiment of the video encoder, the video encoder is configured to combine the first source statistic value and the second source statistic value in order to obtain the combined source statistic value, wherein different weights are associated with the first source statistic value and the second source statistic value. Optionally, the video encoder is configured to change the weights during an encoding process.

In an embodiment of the video encoder, the video encoder is configured to use a different number of bits (for example, $BITS_a$, $BITS_b$) for a representation of the first source statistic value (for example, $a_t$) and of the second source statistic value (for example, $b_t$).

In an embodiment of the video encoder, the video encoder is configured to use different window sizes for the first source statistic value (for example, $a_t$) and for the second source statistic value (for example, $b_t$), and the video encoder is configured to use a comparatively larger number of bits for a representation of the source statistic value having a comparatively larger window size and to use a comparatively smaller number of bits for a representation of the source statistic value having a comparatively smaller window size.

In an embodiment of the video encoder, the video encoder is configured to modify number representations of the first source statistic value $a_t$ and/or of the second source statistic value $b_t$ according to $$a'_t = a_t \gg (BITS_a - BITS_{min})$$

and/or according to $$b'_t = b_t \gg (BITS_b - BITS_{min})$$

before determining the combined source statistic value, wherein $$BITS_{min} = \min(BITS_a, BITS_b), \text{ and}$$

wherein $BITS_a$ is a number of bits allocated for a representation of the first source statistic value and wherein $BITS_b$ is a number of bits allocated for a representation of the second source statistic value.

In an embodiment of the video encoder, the video encoder is configured to determine the combined source statistic value $\tilde{c}_t$ according to $$\tilde{c}_t = (a'_t + b'_t) \gg 1$$

and the video encoder is configured to derive an index value pStateIdx designating a table entry of a table comprising pre-calculated range values for the interval-subdivision according to $$p\text{StateIdx} = ((\tilde{c}_t - 2^{(BITS_{min}-1)}) \text{XOR}(\text{valMPS}-1)) \gg (BITS_{min} - BITS_{tabRes}),$$

wherein a value of a most-probable (for example, binary) value is determined according to $$\text{valMPS} = \tilde{c}_t \gg (BITS_{min} - 1),$$

wherein $BITS_{tabRes}$ describes a number of entries of the table (or a spacing, in terms of a frequency of the binary value, between entries of the table). The table describes, for example, a mapping of probability values within a range from 0 to 0.5 onto pre-calculated range values.

In an embodiment of the video encoder, the video encoder is configured to determine the combined source statistic value $\tilde{c}_t$ according to $$\tilde{c}_t = (a'_t + b'_t) \gg 1,$$

and the video encoder is configured to derive an index value pStateIdx designating a table entry of a table comprising pre-calculated range values for the interval-subdivision according to $$p\text{StateIdx} = \tilde{c}_t \gg (BITS_{min} - BITS_{tabRes}),$$

wherein $BITS_{tabRes}$ describes a number of entries of the table (or a spacing, in terms of a frequency of the binary value, between entries of the table). The table describes, for example, a mapping of probability values within a range from 0 to 1 onto pre-calculated range values.

In an embodiment of the video encoder, the video encoder is configured to choose the number of bits (for example, $BITS_a$, $BITS_b$) for a representation of the first source statistic value (for example, $a_t$) and of the second source statistic value in dependence of the first window size and in dependence on the second window size (for example, according to $BITS_a = \text{ThrHd} + n_a$, wherein $w_a = 2^{n_a}$ or $n_a = \text{round}(\log_2 w_a)$, wherein round( ) is a rounding-up or rounding-down operator, or according to $BITS_b = \text{ThrHd} + n_b$, wherein $w_b = 2^{n_b}$ or $n_b = \text{round}(\log_2 w_b)$, and wherein ThrHd is a predetermined and advantageously fixed value).

In an embodiment of the video encoder, a sum of a total number of bits used for a representation of the first source statistic value (for example, $a_t$) and of the second source statistic value (for example, $b_t$) is constant over different context models (or independent in case of a variation of a number of bits used for the representation of the first source statistic value).

In an embodiment of the video encoder, the video encoder is configured to include an initialization flag (for example, a "ws_flag" or a window size flag) into the bitstream which determines (possibly in addition with other configuration information, like slice type) the first window size and the second window size, and the video encoder is configured to include another initialization parameter or flag (for example, a "cabac init flag") into the bitstream which determines initialization values for the first source statistic value and/or the second source statistic value.

In an embodiment of the video encoder, the video encoder is configured determine the first window size and the second window size also in dependence on a temporal level of a current slice. Alternatively or in addition, the video encoder is configured determine the first window size and the second window size also in dependence on a quantization parameter of a current slice.

In an embodiment of the video encoder, the video encoder is configured to adjust the first window size and/or the second window size in dependence on a position (for example, in dependence on how many binary values have already encoded within the current slice, or since a context initialization, using the context model to which the first window size and/or the second window size are associated, or in dependence on a position of a pixel or of a block of pixels within a frame to which a binary value to be encoded is associated).

In an embodiment of the video encoder, the video encoder is configured to set the first window size and/or the second window size to a start value (which is smaller than a normal value) when encoding a binary value associated with a start position (e.g. a first row of a Block of pixels, or a first column of a block of pixels), and to set the first window size and/or the second window size to a normal value (which is larger than the start value) when encoding a binary value which is associated with a position which is distanced from the start position by at least a predetermined position.

In an embodiment of the video encoder, the video encoder is configured to include signaling flag (for example a "ctu_ws_flag" or a window size change signaling flag) into the bitstream signaling that the window size should be changed within a slice.

In an embodiment of the video encoder, the video encoder is configured to include into the bitstream the signaling flag indicating whether the window size should be changed, for a plurality of coding tree units (or even for all coding tree units), wherein the signaling flag indicates whether to increase or decrease at least one of the window sizes (for example, to jointly increase or decrease all window sizes, even of different context models, by one in dependence on the signaling flag, keeping in mind not to exceed a maximum range of the window size). As an alternative example, the video encoder may only increase or decrease window sizes of some of the context models.

In an embodiment of the video encoder, the video encoder is configured to derive a state index (for example, pStateIdx) from the combined source statistic value (for example, $\tilde{c}_t$ or $\widetilde{c'}_t$ or $p_t$, for example, according to equation (8) or according to equation (12) or according to equation (14)]. Alternatively or in addition, the video encoder may be configured to derive a value representing a most probable binary value or a least probable binary value (e.g. valMPS), for example according to equation (9) or according to equation (13). The video encoder may also be configured to evaluate a table mapping the state index onto the one or more range values for the interval subdivision.

In an embodiment of the video encoder, the video encoder may be configured to temporarily (for example, for the encoding of multiple binary values of the binary sequence, not only directly after an initialization) replace the second source statistic value by a constant replacement value, and to combine the first source statistic value (e.g. $a_t$) with the fixed non-zero replacement value in order to obtain the combined source statistic value.

In an embodiment of the video encoder, the video encoder is configured to choose the first window size $w_a$ and the second window size $w_b$ such that $$n_a = n_b \text{ or}$$

$$|n_a - n_b| \geq 3,$$

wherein $w_a = 2^{n_a}$ or $n_a = \text{round}(\log_2 w_a)$, wherein round( ) is a rounding-up or rounding-down operator, and wherein $w_b = 2^{n_b}$ or $n_b = \text{round}(\log_2 w_b)$.

In an embodiment, the video encoder is configured to choose the first window size $w_a$ and the second window size $w_b$ such that $$|n_a - n_b| \geq 3,$$

wherein $w_a = 2^{n_a}$ or $n_a = \text{round}(\log_2 w_a)$, wherein round( ) is a rounding-up or rounding-down operator, and wherein $w_b = 2^{n_b}$ or $n_b = \text{round}(\log_2 w_b)$.

An embodiment according to the invention creates a video encoder, wherein the video encoder is configured to encode a plurality of video frames (for example, a sequence of video frames), wherein the video encoder is configured to encode a video frame which is subdivided into a set of one or more slices (advantageously a plurality of slices). The video encoder is configured to provide an slice type information (for example, "SliceType") indicating whether a slice is encoded using an independent coding mode (for example, "Intra"), in which there is no prediction of video content of a current frame on the basis of a video content of a previous frame, or using a single-predictive mode (for example, "P") in which there is a prediction of a block of pixels on the basis of one block of pixels (for example, only one block of pixels) of a previous frame (for example, a previously encoded frame]), or using a bi-predictive mode (for example, "B") in which there is a prediction of a block of pixels on the basis of two or more blocks of pixels of one or more previous frames (for example, previously encoded frames). The video encoder comprises an arithmetic encoder for providing an encoded representation of a binary sequence (for example, describing a transform coefficient of an image content) on the basis of the binary sequence (wherein the binary sequence may represent transform coefficients or spectral coefficients, parameters or any other information). The arithmetic encoder is configured to determine a first source statistic value (for example $a_t$), which is, for example, based on a frequency of previously encoded binary values $x_{t-1}, x_{t-2}, \ldots$ and which may also be designated as a "counter variable" or as a counter, using a first window size (for example, $w_a$) which may, for example, be represented by a window size variable. The arithmetic encoder may be configured to determine a first source statistic value, for example, on the basis of a previously encoded binary sequence. The arithmetic encoder is configured to determine a combined source statistic value (for example, $\tilde{c}_t$ or $\widetilde{c'}_t$ or $p_t$), wherein the arithmetic encoder is configured to combine the first source statistic value (for example, at) with a fixed non-zero value in order to obtain the combined source statistic value, and the arithmetic encoder is configured to determine one or more range values for an interval subdivision, which is used for a mapping of the binary sequence onto the encoded representation of the binary sequence, on the basis of the combined source statistic value.

The embodiment can optionally be supplemented by any of the features, functionalities and details of the embodiments described before, both individually and taken in combination.

An embodiment according to the invention creates a method for decoding a video content, wherein the method comprises decoding a plurality of video frames (for example, a sequence of video frames), and wherein the method comprises decoding a video frame which is subdivided into a set of one or more slices (advantageously a plurality of slices). The method comprises evaluating a slice type information (for example, "SliceType") indicating whether a slice is encoded using an independent coding mode (for example, "Intra"), in which there is no prediction of video content of a current frame on the basis of a video content of a previous frame, or using a single-predictive mode (for example, "P") in which there is a prediction of a block of pixels on the basis of one block of pixels (or only one block of pixels) of a previous frame (for example, previously decoded frame), or using a bi-predictive mode (for example, "B") in which there is a prediction of a block of pixels on the basis of two blocks of pixels of one or more previous frames (for example, previously decoded frames), to select a mode of operation for a decoding of a slice. The method comprises providing a decoded binary sequence [for example, describing a transform coefficient of an image content] on the basis of an encoded representation of the binary sequence, and the method comprises determining a first source statistic value (for example, $a_t$), which may, for example, be based on a frequency of previously decoded binary values $x_{t-1}, x_{t-2}, \ldots$, and which may, for example, also be designated as a "counter variable" or "counter", using a first window size (for example, $w_a$) which may, for example, be represented by a window size variable. The first source statistic value may, for example, be determined, on the basis of a previously decoded binary sequence. The method also comprises determining a second source statistic value (for example, $b_t$), which may, for example, be based on a frequency of previously decoded binary values $x_{t-1}, x_{t-2}, \ldots$, using a second window size (for example, $w_b$). The second source statistic value may, for example, be determined on the basis of the previously decoded binary sequence. The method also comprises determining a combined source statistic value (for example $\tilde{c}_t$ or $\widetilde{c'}_t$ or $p_t$) on the basis of the first source statistic value (for example, $a_t$) and on the basis of the second source statistic value (for example, $b_t$). The method also comprises determining one or more range values for an interval subdivision, which is used for a mapping of the encoded representation of the binary sequence onto the decoded binary sequence, on the basis of the combined source statistic value.

An embodiment according to the invention creates a method for decoding a video content, wherein the method comprises decoding a plurality of video frames (for example a sequence of video frames), and wherein the method comprises decoding a video frame which is subdivided into a set of one or more slices (advantageously a plurality of slices). The method comprises evaluating a slice type information (for example, "SliceType") indicating whether a slice is encoded using an independent coding mode (for example, "Intra"), in which there is no prediction of video content of a current frame on the basis of a video content of a previous frame, or using a single-predictive mode (for example, "P") in which there is a prediction of a block of pixels on the basis of one block of pixels (for example, only one block of pixels) of a previous frame (for example, previously decoded frame), or using a bi-predictive mode (for example, "B") in which there is a prediction of a block of pixels on the basis of two or more blocks of pixels of one or more previous frames (for example, previously decoded frames), to select a mode of operation for a decoding of a slice. The method comprises providing a decoded binary sequence (for example, describing a transform coefficient of an image content) on the basis of an encoded representation of the binary sequence. The method comprises determining a first source statistic value (for example, $a_t$), which may, for example, be based on a frequency of previously decoded binary values $x_{t-1}, x_{t-2}, \ldots$ and which may also be designated as a "counter variable", "counter" using a first window size (for example, $w_a$) which may, for example, be represented by a window size variable. For example, the first source statistic value may be determined on the basis of a previously decoded binary sequence. The method comprises determining a combined source statistic value (for example, $\tilde{c}_t$ or $\widetilde{c'}_t$ or $p_t$), wherein the first source statistic value (for example $a_t$) is combined with a fixed non-zero value in order to obtain the combined source statistic value. The method further comprises determining one or more range values for an interval subdivision, which is used for a mapping of the encoded representation of the binary sequence onto the decoded binary sequence, on the basis of the combined source statistic value.

An embodiment creates a method for encoding a video content, wherein the method comprises encoding a plurality of video frames (for example, a sequence of video frames), and wherein the method comprises encoding a video frame which is subdivided into a set of one or more slices (advantageously a plurality of slices). The method comprises providing slice type information (for example, "SliceType") indicating whether a slice is encoded using an independent coding mode (for example, "Intra"), in which there is no prediction of video content of a current frame on the basis of a video content of a previous frame, or using a single-predictive mode (for example, "P") in which there is a prediction of a block of pixels on the basis of one block of pixels (for example, only one block of pixels) of a previous frame (for example, a previously encoded frame), or using a bi-predictive mode (for example, "B") in which there is a prediction of a block of pixels on the basis of two blocks of pixels of one or more previous frames (for example, previously encoded frames). The method comprises providing an encoded representation of a binary sequence (for example, describing a transform coefficient of an image content) on the basis of the binary sequence (wherein the binary sequence may represent transform coefficients or spectral coefficients, parameters or any other information). The method comprises determining a first source statistic value (for example, $a_t$), which may, for example, be based on a frequency of previously encoded binary values $x_{t-1}, x_{t-2}, \ldots$ and which may, for example, be designated as a "counter variable" or "counter", using a first window size (for example, $w_a$) which may, for example, be represented by a window size variable. The first source statistic value may, for example, be determined on the basis of a previously encoded binary sequence. The method also comprises determining a second source statistic value (for example, $b_t$), which may, for example, be based on a frequency of previously encoded binary values $x_{t-1}, x_{t-2}, \ldots$, using a second window size (for example, $w_b$). The second source statistic value may, for example, be determined on the basis of the previously encoded binary sequence. The method also comprises determining a combined source statistic value (for example, $\tilde{c}_t$ or $\widetilde{c'}_t$ or $p_t$) on the basis of the first source statistic value (for example, $a_t$) and on the basis of the second source statistic value (for example, $b_t$). The method comprises determining one or more range values for an interval subdivision, which is used for a mapping of the binary sequence onto the encoded representation of the binary sequence, on the basis of the combined source statistic value.

An embodiment creates a method for encoding a video content, wherein the method comprises encoding a plurality of video frames (for example, a sequence of video frames), wherein the method comprises encoding a video frame which is subdivided into a set of one or more slices (advantageously a plurality of slices). The method comprises providing a slice type information (for example, "SliceType") indicating whether a slice is encoded using an independent coding mode (for example, "Intra"), in which there is no prediction of video content of a current frame on the basis of a video content of a previous frame, or using a single-predictive mode (for example, "P") in which there is a prediction of a block of pixels on the basis of one block of pixels (for example, only one block of pixels) of a previous frame (for example, a previously encoded frame), or using a bi-predictive mode (for example, "B") in which there is a prediction of a block of pixels on the basis of two or more blocks of pixels of one or more previous frames (for example, previously encoded frames). The method comprises providing an encoded representation of a binary sequence (for example, describing a transform coefficient of an image content) on the basis of the binary sequence (wherein the binary sequence may represent transform coefficients, or spectral coefficients, parameters or any other information). The method comprises determining a first source statistic value (for example, $a_t$), which may, for example, be based on a frequency of previously encoded binary values $x_{t-1}, x_{t-2}, \ldots$ and which may, for example, be designated as a "counter variable" or "counter", using a first window size (for example, $w_a$) which may be represented by a window size variable. The first source statistic value may, for example be determined on the basis of a previously encoded binary sequence. The method comprises determining a combined source statistic value (for example, $\tilde{c}_t$ or $\widetilde{c}_t$ or $p_t$), wherein the first source statistic value (for example, $a_t$) is combined with a fixed non-zero value in order to obtain the combined source statistic value. The method comprises determining one or more range values for an interval subdivision, which is used for a mapping of the binary sequence onto the encoded representation of the binary sequence, on the basis of the combined source statistic value.

It should be noted that all the methods described herein may optionally be supplemented by any of the features, functionalities and details described with respect to the corresponding apparatuses (e.g. vide encoders and video decoders), both individually and in combination. Also, the apparatuses may be adapted in parallel with the methods. In other words, a description of an apparatus, or of a functional bock, also corresponds to the description of a method or method step.

Another embodiment according to the invention creates a computer program for performing at least one of the methods described herein when the computer program runs on a computer.

An embodiment according to the present invention creates a video bitstream comprising an encoded representation of the binary sequence, which represents the video content, and a configuration information describing a configuration of a video decoder to be used to reconstruct the video content on the basis of the encoded representation of the binary sequence. The configuration information comprises a window size information (for example, "ws_flag") describing a window size to be used by a video decoder to determine a first source statistic value (for example, $a_t$) which is based on a frequency of previously decoded binary values and which is used to determine one or more range values for an interval subdivision, wherein the one or more range values are used for a mapping of the encoded representation of the binary sequence onto the decoded binary sequence. Alternatively or in addition, the configuration information comprises a window size information (for example, "ws_flag") describing a window size to be used by a video decoder to determine a second source statistic value (for example, $b_t$) which is based on a frequency of previously decoded binary values and which is used to determine one or more range values for an interval subdivision.

In an embodiment of the video stream, the video bitstream also comprises an initialization value information describing an initialization value of the first source statistic value and/or of the second source statistic value.

In an embodiment of the video stream, the video bitstream further comprises a window size change flag (for example, ctu_ws_flag) which indicates that the window size should be increased or decreased (for example, within a slice).

The video stream can be supplemented by any of the features and details described herein both individually and in combination.

It should be noted that the terms "window size", "first window size" and "second window size" are used throughout the present description. However, it should be noted that, instead of a window size, an estimation parameter may optionally be used in any of the embodiments. Instead of the first window size, a first estimation parameter can optionally be used in any of the embodiments. Instead of the second window size, a second estimation parameter can optionally be used in any of the embodiments.

In other words, the first estimation parameter may be a first window size, and the second estimation parameter may be a second window size.

The first estimation parameter may, alternatively, be a first inertia parameter which determines a speed at which the first source statistic value follows a change of a frequency of decoded binary symbols in the decoded binary sequence (or of previously encoded binary values, in the case of an encoder), and the second estimation parameter may alternatively be a second inertia parameter which determines a speed at which the second source statistic value follows a change of a frequency of decoded binary symbols in the decoded binary sequence (or of previously encoded binary values, in the case of an encoder).

Also, different concepts for the determination of the source statistic values can optionally be used in any of the embodiments.

For example, the video decoder may be configured to determine a first source statistic value using a table lookup, wherein a table entry is selected in dependence on a previously determined source statistic value, a previously decoded binary value and the first estimation parameter. Alternatively or in addition, the video decoder is configured to determine a second source statistic value using a table lookup, wherein a table entry is selected in dependence on a previously determined source statistic value, a previously decoded binary value and the second estimation parameter.

A similar concept can optionally be used in a video encoder, wherein a previously encoded binary value may take the role of the previously decoded binary value.

BRIEF DESCRIPTION OF THE DRAWINGS

Embodiments of the present invention will be detailed subsequently referring to the appended drawings, in which:

FIG. 4 shows a flowchart of a method for video decoding, according to an embodiment of the present invention;

FIG. 5 shows a flowchart of a method video encoding, according to an embodiment of the present invention;

FIG. 7A shows, as Table 1, a representation of a bitmask of an 8-bit variable $w_{spair}$;

FIG. 7B shows, as Table 2, a graphic representation of an assignment of $w_{spair}$ values; and FIG. 7C shows, as Table 3, a graphic representation of an assignment of $w_{spair}$ values dependent on ws_flag.

DETAILED DESCRIPTION OF THE INVENTION

Figure 1:
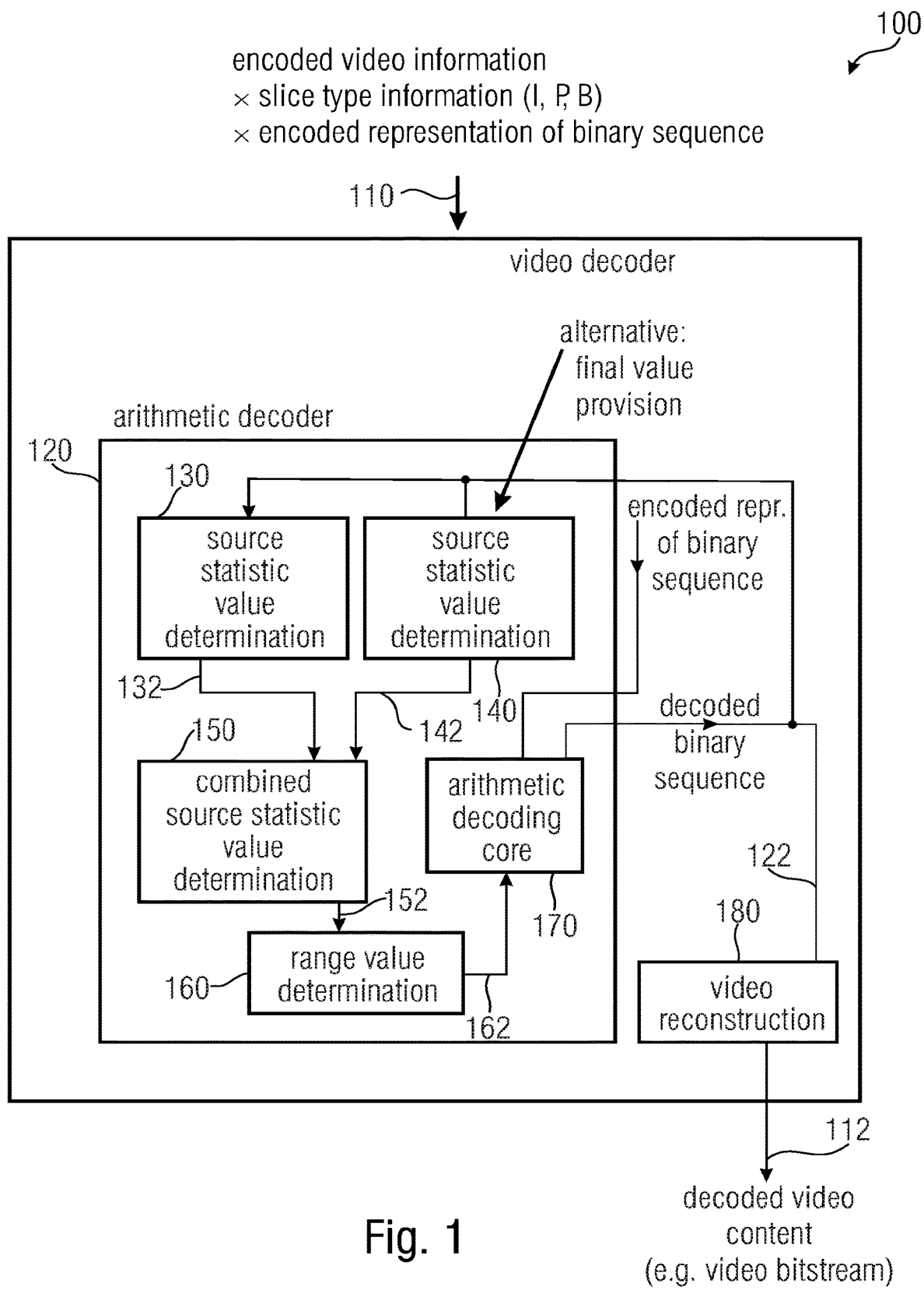
FIG. 1 shows a block schematic diagram of a video decoder, according to an embodiment of the present invention.

1) Embodiment According to FIG. 1

FIG. 1 shows a block schematic diagram of a video decoder 100, according to an embodiment of the invention.

The video decoder 100 is configured to receive an encoded video information and to provide, on the basis thereof, a decoded video information (or decoded video content).

The encoded video information 110 (which may be considered as a video bitstream) may, for example, comprise a slice-type information and may also comprise an encoded representation of a binary sequence. Optionally, the encoded video information 110 may comprise additional information which, however, is not essential for the present invention.

Generally speaking, the video decoder is configured to decode a plurality of video frames (for example, a sequence of video frames), and the video decoder is, in particular, configured to decode a video frame which is subdivided into a set of one or more slices (advantageously into a plurality of slices). The video decoder is also configured to evaluate the slice type information, which is included in the encoded video information 110, and which indicates whether a slice is encoded using an independent coding mode, in which there is no prediction of video content of a current frame on the basis of a video content of a previous frame, or using a single-predictive mode, in which there is a prediction of a block of pixels on the basis of one block of pixels of a previous frame, or using a bi-predictive mode in which there is a prediction of a block of pixels on the basis of two or more blocks of pixels of one or more previous frames, to select a mode of operation for a decoding of a slice (which may, for example, be performed by a "video reconstruction" block 180).

The video decoder 100 comprises an arithmetic decoder 120 which is, for example, configured to provide a decoded binary sequence 122 (for use by the "video reconstruction" block) on the basis of the encoded representation of the binary sequence, which is included in the encoded video information 110. The arithmetic decoder comprises a first source static value determination 130 and a second source statistic value determination 140. Accordingly, the arithmetic decoder 120 is configured to determine a first source statistic value 132 using a first window size and to determine a second source statistic value 142 using a second window size. The arithmetic decoder also comprises a combiner 150. Accordingly, the arithmetic decoder is configured to determine a combined sourced statistic value 152 on the basis of the first source static value and on the basis of the second source statistic value. Moreover, the arithmetic decoder 120 comprises a range value determination 160. Accordingly, the arithmetic decoder may be configured to determine one or more range values for an interval subdivision, which is used for a mapping of the encoded representation of the binary sequence (which is included in the encoded video information 110) onto the decoded binary sequence 122 (which is used by the video reconstruction block 180), on the basis of the combined source statistic value 152.

Advantageously, the arithmetic decoder 120 also comprises an arithmetic decoding core 170 (which may, for example, be a block or a unit), which receives the one or more range values 162 from the range value determination 160, and which uses the range values to derive the decoded binary sequence 122 from the encoded binary sequence included in the encoded video information 110.

Moreover, the video decoder may, for example, comprise a video reconstruction block (or unit) 180, which receives the decoded binary sequence 122 and which provides the decoded video content 112 on the basis of the decoded binary sequence 122 (possibly considering additional control information, like the slice-type information).

To conclude, the arithmetic decoder 100 receives the encoded video information 110 and performs an arithmetic decoding of an encoded representation of a binary sequence, to derive the decoded binary sequence 122. The arithmetic decoding exploits knowledge about probabilities of binary values in the decoded binary sequence 122. This knowledge about the probability (or estimated probability) of binary values within the decoded binary sequence 122 is considered by the arithmetic decoding core 170 by relying on range values 162 which define an interval subdivision. Briefly speaking, the arithmetic decoding core can use the range values 162 to define different intervals (for example, between zero and one, or over a range of integer values). The arithmetic decoding core can, for example, interpret the encoded representation of the binary sequence as a representation of a number, which lies in one of the intervals defined using the range values. By recognizing in which of the intervals the number represented by the encoded representation of the binary sequence lies, the arithmetic decoding core 170 can conclude which bit or which bit sequence has been encoded using the encoded representation of the binary sequence.

However, it should be noted that this explanation of the arithmetic decoding core 170 should only be considered a very brief and generic explanation. Details regarding the arithmetic decoding core can, for example, be seen in the standards H.264 and H.265. However, different concepts (for the operation of an arithmetic decoding core) can also be seen in the literature, and the details of the arithmetic decoding core are not of particular relevance for the present invention.

However, in order to obtain well-suited range values (which allow for a high bitrate efficiency), the arithmetic decoder 120 (or, generally speaking, the video decoder) determines two source statistic values 132, 142 using different window size (wherein the "window size" defines a degree of smoothing over a plurality of decoded binary values of the decoded binary sequence 122). Moreover, to increase the reliability of the range values provided to the arithmetic decoding core 170, the first source statistic value 132 and the second source statistic value 142 are combined into the combined source statistic value 152.

Accordingly, it can be said that the video decoder 100 provides a high efficiency, because the range values used by the arithmetic decoding core 170 are well-adapted to the actual probability of bit values (for example, of bit values "0" and "1" within the decoded binary sequence 122).

As an additional remark, it should be noted that the video decoder 100 can also be modified. In an alternative implementation, the second source statistic value determination 140 can be replaced by the provision of a fixed value (which may be independent from the decoded binary sequence, but which may depend on one or more parameters). In this case, the arithmetic decoder is configured to combine the first source statistic value 132 with the fixed non-zero value in order to obtain the combined source statistic value 152. It has been found that such a simplification brings good results in some cases and may, for example, avoid inappropriately strong variations of the combined source statistic value. In other words, by introducing a fixed contribution into the determination of the combined source statistic value, it can be achieved that the combined source statistic value can no longer deviate too strongly from this fixed value. Accordingly, some "hindsight" into the statistics of the decoded binary sequence can be used to avoid a strong degradation of the coding efficiency if, by chance, there is a longer sequence of identical bit values within the decoded binary sequence 122.

As an additional remark, it should be noted that the functionality of the arithmetic decoder (and of the individual blocks of the arithmetic decoder) can, generally, also be considered as a functionality of the video decoder in its entirety. In other words, the functionalities described herein as functionalities of the arithmetic decoder can also be performed by other blocks of the video decoder.

Moreover, it should be noted that the video decoder 100 according to FIG. 1 can be supplemented by any of the features, functionalities and details described herein, both individually and taken in combination.

Figure 2A:
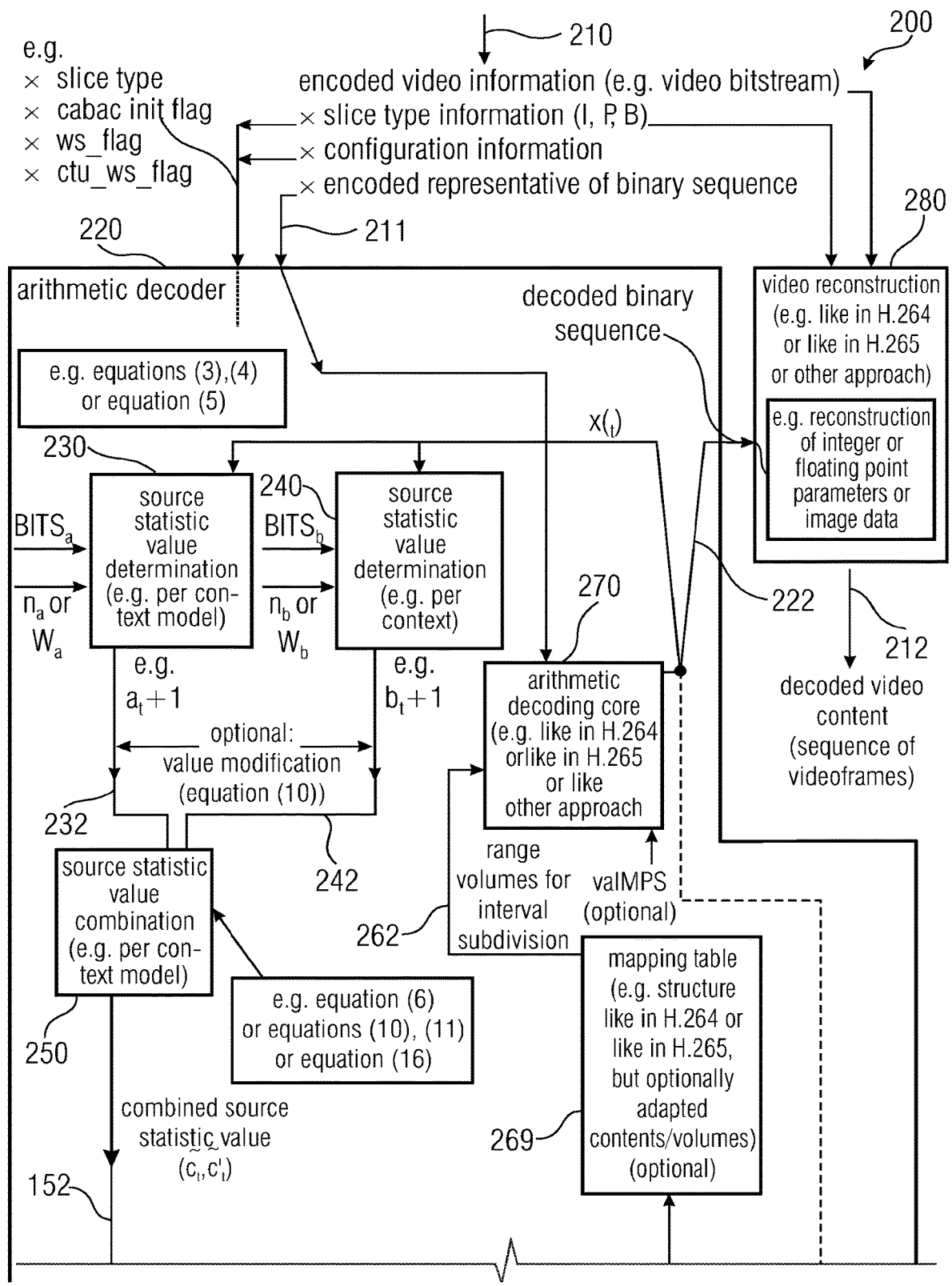
FIG. 2A-FIG. 2B shows a block schematic diagram of a video decoder, according to another embodiment of the present invention.
Figure 2B:
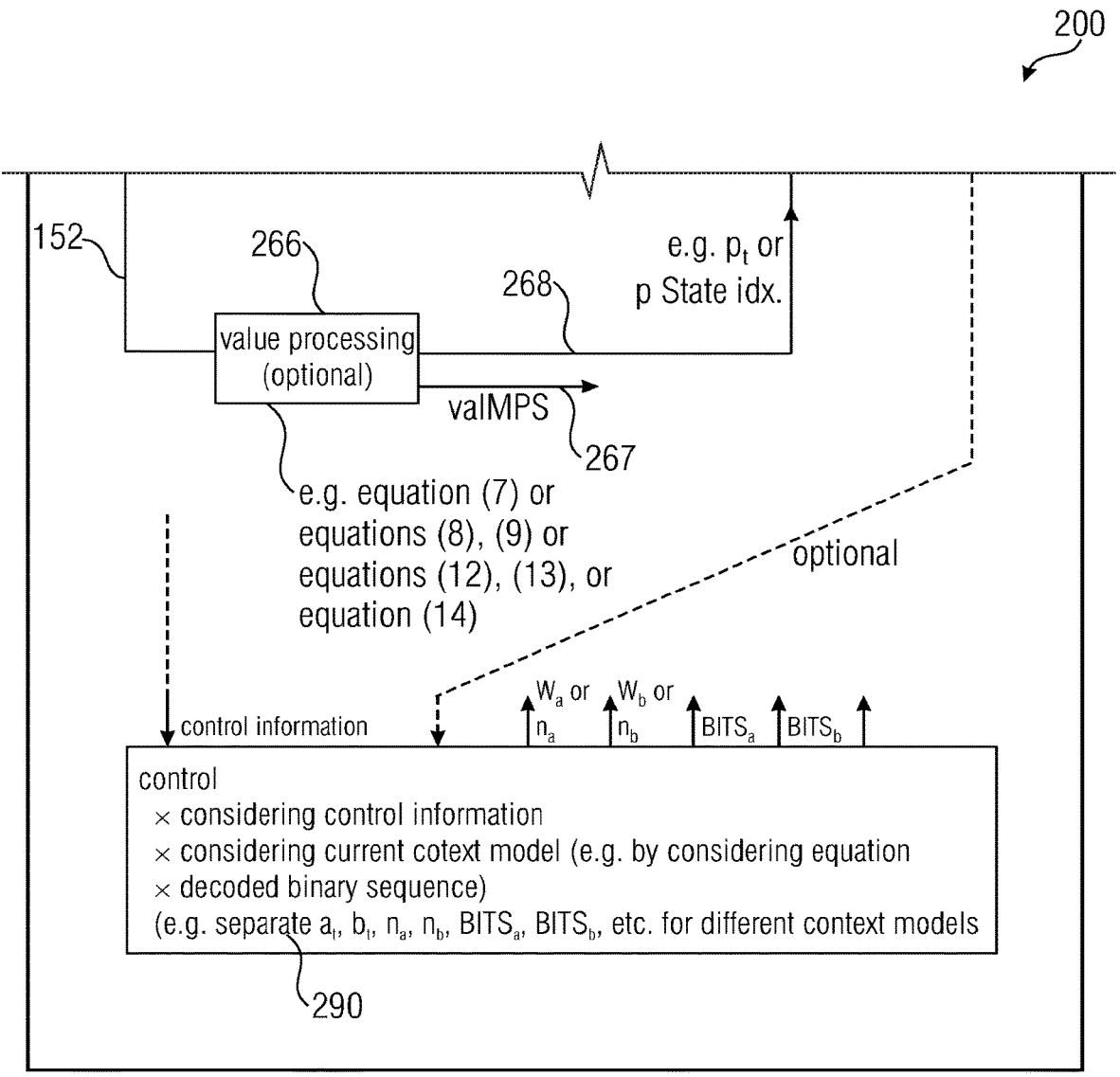

2) Video Decoder According to FIGS. 2 and 2B

FIGS. 2A and 2B show a block schematic diagram of a video decoder 200, according to an embodiment of the invention.

The video decoder 200 is configured to receive an encoded video information 210 (for example, a video bitstream) and to provide, on the basis thereof, a decoded video content 212 (for example, a sequence of video frames). The encoded video information 210 may, for example, comprise a slice type information, as described herein. The encoded video information 210 may further comprise configuration information, which can also be considered as control information. Moreover, the encoded video information 210 may comprise an encoded representation of a binary sequence.

In FIGS. 2A and 2B, two main blocks of the video decoder 200 are shown, namely an arithmetic decoder 220 and video reconstruction 280. However, it should be noted that the distribution of functionalities of the video decoder is not bound to a fixed block structure, but could also be modified over a wide range. Also, it should be noted that actual implementations of the video decoder could have additional blocks and/or functionalities, which are well-known to the men skilled in the art.

The arithmetic decoder 220 receives the encoded representation 211 of the binary sequence. However, the arithmetic decoder (or a control block which may be outside of the arithmetic decoder) also receives the slice type information and the configuration information (or control information). In particular, the arithmetic decoder 220 provides a decoded binary sequence 222 to the video reconstruction 280 on the basis of the encoded representation 211 of the binary sequence and taking into consideration some or all of the slice type information and the configuration information or control information.

In the following, the functionality of the arithmetic decoder 220 will be described in more detail. The arithmetic decoded comprises an arithmetic decoding core 270, which receives the encoded representation 211 of the binary sequence and which provides the decoded binary sequence 222. The arithmetic decoding core determines which bit values of the decoded binary sequence 222 are represented by the encoded representation 211 of the binary sequence. For this purpose, the arithmetic decoding core 270 checks in which interval of a range of numbers a number represented by the encoded representation 211 of the binary sequence lies. Depending on the decision in which interval, out of a plurality of (at least two) intervals, a number represented by the encoded representation 211 of the binary sequence lies, a certain bit value, or a group of bit values, of the decoded binary sequence 222 is recognized.

For the purpose of deriving the decoded binary sequence 222, the arithmetic decoding core receives an information about the intervals, which typically corresponds to some degree with probabilities of bit values. In the present case, the arithmetic decoding core 270 receives "range values" 262 which are used for the interval subdivision (i.e., range values 162 which serve to define intervals of the number range to be used by the arithmetic decoding core 270). In particular, it should be noted that the arithmetic decoding core 270 may, for example, be similar or identical to an arithmetic decoding core used in a video encoder/decoder according to standard H.264 or in a video encoder/decoder according to standard H.265. However, it should be noted that different approaches to realize the arithmetic decoding core 270 could also be used.

In view of the above discussion, it becomes apparent that it is an important functionality of the arithmetic decoder 220 to provide the range values 262 which define the interval subdivision for the arithmetic decoding core 270. Generally speaking, the arithmetic decoder 220 derives these range values 262 from previously decoded binary values of the decoded binary sequence 222, taking into consideration some control-information which defines parameters like, for example, initialization values, "window sizes", "window size adaptation", and the like.

In the arithmetic decoder 200, two source statistic value determination blocks (or units) 230, 240 are used. For example, the first source statistic value determination block 230 receives one or more previously decoded binary values of the decoded binary sequence 222 (also designated with $x_t$), and provides, on the basis thereof, a first sources statistic value 232. The first source statistic value determination block may, for example, receive some configuration information, like a constant or variable $BITS_a$, defining a number of bits used to represent the source statistic value 232, and a constant or variable $n_a$ which defines a "window size" to be used by the source statistic value determination block 230. For example, the first source statistic value determination block 230 may recursively determine the first source statistic value 232, wherein the window size $n_a$ determines a weighting of a most recently decoded binary value of the decoded binary sequence 222 in the determination of the first source statistic value 232.

The functionality of the first source statistic value determination block 230 is, for example, similar to the formation of a sliding average having a certain window size, except for the fact that a recursive algorithm is used which introduces some "infinite impulse response" characteristic. Thus, the first source statistic value 132 does not exactly represent a result of a sliding window summation operation or of a sliding window averaging operation, but rather should be considered as a "virtual sliding window" operation, since the result is very similar.

Moreover, the second source static value determination block 240 performs a similar operation when compared to the first source statistic value determination block 230. However, the second source statistic value determination block 240 typically uses different parameters (for example, different window length $n_b$ and/or a different bit number parameter $BITS_b$), and consequently provides a second source statistic value 242, which is typically different from the first source statistic value 232. For example, one of the source statistic values 232, 242 may be a short term (or shorter term) average source statistic value and one of the source statistic values 232, 242 may be a long term (or longer-term) average source statistic value.

It should be noted that the source statistic value determination blocks 230, 240 may, for example, perform a functionality as defined by equations (3) and (4) discussed in detail below. Alternatively, the source statistic value determination blocks 230, 240 may also perform the functionality as defined by equation (5) discussed below. Moreover, it should be noted that different computation rules could also be used in the source statistic value determination blocks 230, 240 in some embodiments.

The arithmetic decoder 220 further comprises a combined source statistic value determination block (or unit) 250, which is configured to receive the first source statistic value 232 and the second source statistic value 242. The source statistic value combination block 250 provides a combined source statistic value 252 on the basis thereof. For example, the source statistic value combination block 250 may form a sum or an average of the first source statistic value 232 and of the second source statistic value 242, to thereby obtain the combined source statistic value 252.

However, the source statistic value combination block 250 could also apply different weightings to the first source statistic value 232 and to the second source statistic value 242 when deriving the combined source statistic value 252, wherein the different weightings may even vary within a slice or between different slices.

For example, the source statistic value combination block 250 may perform the functionality as defined by equation (6) mentioned below or as defined by equations (10) and (11) mentioned below or as defined by equation (16) mentioned below. However, a variation of this functionality is also possible.

For example, in one (alternative) embodiment, the source statistic value combination block 250 combines only one of the first statistic values with a fixed value, to thereby obtain the combined source statistic value 252. Such a concept may be advantageous to avoid that the combined source statistic value 252 deviates by too much from an expected probability of binary values within the decoded binary sequence 222.

The arithmetic decoder 220 is configured to derive the range values 262 for the interval subdivision (which are to be provided to the arithmetic decoding core 270) on the basis of the combined source statistic value 252. This processing step may, for example, be considered as "range value determination". For example, the range value determination may comprise an optional value processing 266, which receives the combined source static value 252 and provides, on the basis thereof, a probability value or a state index value. The value processing 266 may, for example, map the range of values of the combined source statistic value 252 onto a range between 0 and 1, or onto a range between 0 and 0.5, or onto an integer index value. For example, the value processing 266 may be performed according to equation (7) described below, or according to equations (8), (9) described below, or according to equations (12), (13) described below, or according to equation (14) described below.

Optionally, the value processing 266 may provide information 267, which may be a binary information that indicates whether it is more likely that the next decoded value (for example, of the decoded binary sequence 222) takes a value of "1" or takes a value "0". Optionally, the arithmetic decoder (or the range value determination) may comprise a mapping table 269. The mapping table 269 may, for example, receive an index value (for example, pStateIdx) which designates a table entry. Accordingly, the mapping table 269 may provide one or more range values 262 corresponding to said table entry designated by the index value (for example pStateIdx). Accordingly, by deriving a "state index value" (e.g., pStateIdx) and by evaluating the mapping table on the basis of the state index value, one or more range values for the interval subdivision may be provided on the basis of the combined source static value 252.

The mapping table 269 may, for example, have the same structure like a mapping table described in the standard H.264 or in the standard H.265. However, optionally, the contents of the mapping table may be adapted to the specific details of the video decoder. In particular, entries of the mapping table can be adapted to the statistic properties expected in the specific video decoder.

The arithmetic decoder (or, generally speaking, the video decoder) also comprises a control block 290 which may receive a control information or configuration information and which may adjust the parameters used for the provision of the range values (and possibly also other parameters, for example additional parameters used by the arithmetic decoding core 270) on the basis thereof. For example, the control block 290 may receive one or more of the slice type information, a "cabac init flag", a "ws_flag" and a "ctu_ws_flag", which may be included in the encoded video information 210.

Moreover, the control 290 may, for example, adjust the window size parameters $n_a$, $n_b$ and the bit size parameters $BITSa$, $BITS_b$ in dependence on the control information. In particular, the control block 290 may also a consider a current context model. Regarding this issue, it should be noted that, for each bit (or group of bits) of the decoded binary sequence 222 to be decoded, it may be decided which context model is to be used. For example, the decision which context model is to be used may be based on the fact which type of information (decoding parameter, transform coefficient, etc.) is represented by the respective bit (or group of bits). For example, the control block 290 may be configured to recognize the syntax of the decoded binary sequence 222, to thereby recognize which syntax element (or which part of a syntax element, for example, a most significant bit or a least significant bit, or the like) is to be decoded next. Accordingly, a selection between different context models may be made. Also, it should be noted that the window size parameters and/or the bit size parameters and/or any other parameters may be chosen dependent on the context model. Furthermore, it should also be noted that the source statistic values 232,242 or the combined source statistic value 252 may be associated with a specific context model, such that different source statistic values or combined source statistic values may be available for different context models. For example, a source statistic value associated with a certain context model may be selectively provided on the basis of decoded binary values of the decoded binary sequence 222 which have been decoded using the respective context model. In other words, a separate, independent processing, and a separate (possibly independent) decision regarding the parameters $n_a$, $n_b$, $BITS_a$, $BITS_b$, etc., may be made for different context models.

Regarding the functionality of the control unit 290, it should be noted that the control unit may determine the parameters $n_a$, $n_b$, $BITS_a$, $BITS_b$, for example, in accordance with the mechanisms described below. For example, the window size parameters $n_a$, $n_b$, may be chosen in dependence on the slice type information, and/or in dependence on the cabac init flag, and/or in dependence on the ws_flag and/or in dependence on the ctu_ws_flag. Also, the bit size parameters BITSa, $BITS_b$ may be chosen in dependence on some configuration information in some embodiments. However, in other embodiments, the bit size parameters may be fixed. Regarding the mechanisms for the adjustment of the parameters, reference is made, for example, to the discussion below.

Taking reference now to the video reconstruction block 280, it should be noted that the video reconstruction block 280 typically receives the decoded binary sequence 222 and also at least some elements of the configuration information. For example, the video reconstruction 280 may reconstruct integer parameters and/or floating point parameters and/or image data on the basis of the decoded binary sequence 222. For example, there may be a mapping rule which defines how a certain bit or portion of the decoded binary sequence should be mapped onto an integer parameter or onto a floating point parameter or onto image data (for example, transform coefficients or the like). Accordingly, the video reconstruction block 280 reconstructs information used for the reconstruction of a video frame from the decoded binary sequence 222. Then, the video reconstruction block may generate image information on the basis of the reconstructed information (derived from the decoded binary sequence 222).

For example, the video reconstruction 280 may comprise the same functionality as describe in the standard H.264 or in the standard H.265. However, other approaches may also be used for the video reconstruction which are adapted to provide a decoded video content on the basis of a decoded binary sequence (and, possibly, additional configuration information or control information). Accordingly, the video reconstruction 280 provides a decoded video content 212, which may take the form of as sequence of video frames.

To conclude, an overview of a video decoder according to an embodiment of the invention has been provided. However, it should be noted that there are different implementations for the functional blocks (for example, for the source statistic value determination blocks 230, 240, for the source statistic value combination block 250, for the value processing block 266, for the mapping table 269 and for the arithmetic decoding core 270. Also, different implementations are possible for the video reconstruction block 280 and for the control block 290.

However, it should also be noted that the functional blocks described herein may be supplemented by any of the features, functionalities and details disclosed within the present application in its entirety. Also, it should be noted that the features, functionalities and details disclosed within the present application can be introduced individually or taken in combination, to thereby extend the functionality of the video decoder 200.

Figure 3:
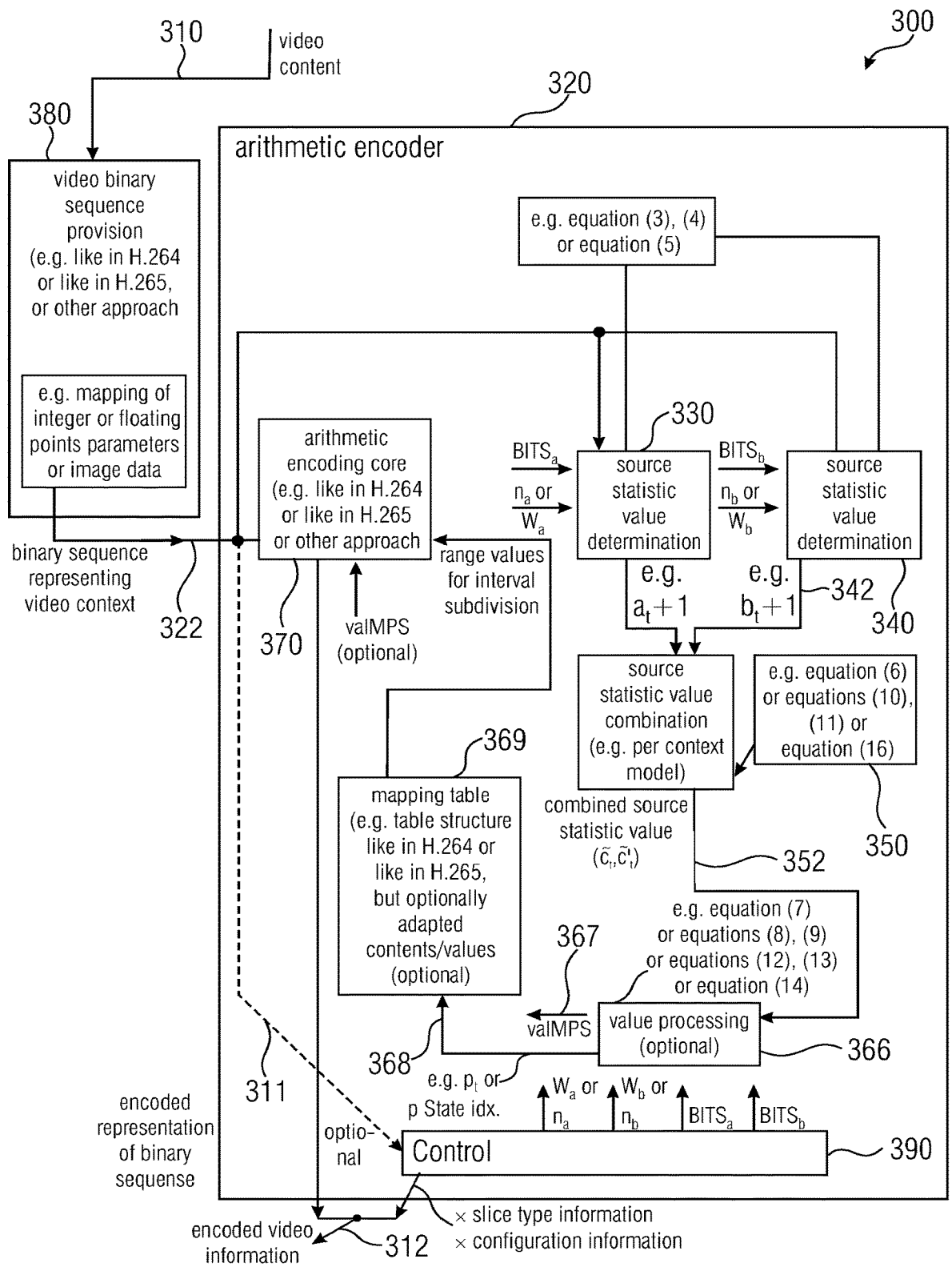
FIG. 3 shows a block schematic diagram of a video encoder, according to an embodiment of the invention.

3) Video Encoder According to FIG. 3

FIG. 3 shows a block schematic diagram of a video encoder 300, according to an embodiment of the present invention. The video encoder 300 is configured to receive a video content 310 and to provide, on the basis thereof, an encoded video information (for example, a video bitstream) 312.

The video encoder 300 comprises a video binary sequence provision block 380, which is configured to receive the video content 310 to provide, on the basis thereof, a binary sequence 322 which represents the video content 310. For example, the video binary sequence provision 380 may be performed like in a video encoder according to the standard H.264 or the like in a video encoder according to the standard H.265. However, different approaches for the provision of a video binary sequence may also be used. Also, it should be noted that the video binary sequence provision 380 may, for example, comprise a mapping of integer-valued or floating-point parameters or image data (like, for example, transform coefficients) onto a sequence of binary values.

Furthermore, an arithmetic encoder 320 may receive the binary sequence 322 and provide, on the basis thereof, an encoded representation 311 of the binary sequence 322. Generally speaking, the arithmetic encoder 320 is configured to exploit knowledge (or information) about probabilities of binary values within the binary sequence 322 to provide an efficiently compressed representation of the binary sequence 322 (namely the encoded representation 311 of the binary sequence).

The arithmetic encoder 320 may, for example, comprise an arithmetic encoding core 370, which receives the binary sequence 322 and which provides, on the basis thereof, the encoded representation 311 of the binary sequence. The arithmetic encoding core 370 may, for example, involve some knowledge about probabilities of bits (or groups of bits) in the binary sequence 322, in order to be able to find a proper codeword (which is included into the encoded representation 311) representing the bit or group of bits. Advantageously, the arithmetic encoding core 370 receives range values 362 which describe a subdivision of intervals. While the range values 362 may describe a subdivision of intervals which is to be used by a video decoder 200 (or by the arithmetic decoding core 270 thereof), this information may naturally also be useful for the arithmetic encoding core 370, because the arithmetic encoding core 370 should provide an encoded representation 311 of the binary sequence which is decodable by a corresponding video decoder.

Thus, the arithmetic encoder 320 may be configured to derive the range value 362 for the interval subdivision on the basis of the binary sequence 322 representing the video content, and also on the basis of some parameters, like the window size information $n_a$, $n_b$, or the bit size information $BITS_a$, $BITS_b$. It should be noted that the derivation of the range values 362 is substantially identical to the derivation of the range values 162, 262, except for the fact that the binary sequence 322 is evaluated instead of the decoded binary sequence 222. In other words, previously encoded binary values are used instead of previously decoded binary values when deriving the range values 362 on the basis of the binary sequence 322.

As can be seen, the arithmetic encoder 320 of the video encoder comprises source statistic value determination blocks 330, 340, which are substantially identical to the source statistic value determination blocks 130, 140, 230, 240, except for the fact that they provide the first source statistic value 332 and the second source statistic value 342 on the basis of previously encoded binary values (rather than on the basis of previously decoded binary value). The source statistic value determinators 330, 340 may, for example, use the parameters $n_a$, $n_b$, $BITS_a$ and $BITS_b$. Moreover, the functionality of the source statistic determinators 330, 340 may, for example, be defined by the equations (3) and (4) as described below, or by equation (5) as described below.

Moreover, the arithmetic encoder 320 also comprises a source statistic value combination block 350, which may correspond to the source statistic value combination block 150 or the source statistic value combination block 250. Accordingly, a combined source statistic value 352 is provided, wherein the functionality of the source statistic value combination block 350 may, for example, follow equation (6) or equations (10) and (11) or equation (16).

The arithmetic encoder 320 also comprises an optional value processing 366, which may correspond to the value processing 266 shown in FIGS. 2A and 2B. The value processing 366 may receive the combined source statistic value 352 and may, for example, provide an information 367 about a most probable binary value and/or a probability information or state index information 368. The arithmetic encoder 320 also comprises a mapping table 369, which may correspond to the mapping table 269 described with reference to FIGS. 2A and 2B. Accordingly, the one or more range values 362 for the interval subdivision may be provided by the evaluation of the mapping table 369 using a probability value or state index 368.

To conclude, the arithmetic encoder 320 may select the range values 362 on the basis of the binary sequence 322 in the same manner as the arithmetic decoder 220 selects the range values 262 on the basis of the decoded binary sequence 222. Accordingly, synchronism between the arithmetic encoder 320 of the video encoder 300 and the arithmetic decoder 220 of the video decoder 200 can be achieved, provided that there are no decoding errors and provided that the same parameters are used at the side of the video encoder and at the side of the video decoder.

Moreover, it should be noted that the arithmetic encoder 320, or, generally speaking, the video encoder 300, comprises a control block 390, which may determine the parameters $n_a$, $n_b$, $BITS_a$, $BITS_b$, and any other parameters which may be needed. For example, the control blocks 390 may use some empiric mechanisms to decide about the parameters. Alternatively (or in addition), the control block 390 may also analyze, which combination of parameters results in a lowest possible bit rate (or fulfils any other optimization criterion).

Moreover, it should be noted that the video encoder 300 may, for example, provide, within the encoded video information 312, some control information which controls the operation of the video decoder 200. For example, this control information (or configuration information) may comprise one or more of the following: a slice type information, a cabac init flag, a ws_flag and a ctu_ws_flag. The functionality of these configuration information items, and the possible encoding and decoding thereof, will be described below. The slice type information may be provided like in the video encoders according to standards H.264 or H.265 (for example, by the video binary sequence provision 380) and may be used by the video reconstruction 180, 280 like in video decoders according to standards H.264 or H.265. In addition, the slice type information may be used in the decision about the window size(s), as outlined herein.

Moreover, it should be noted that distribution of the functional blocks can be modified. In the embodiment of FIG. 3, the arithmetic encoding core 370, the source statistic value determinator blocks 330, 340, the source statistic value combination block 350, the value processing block 366 and the mapping table 369 and the control 390 have been described as being part of the arithmetic encoder. However, said blocks could also generally be blocks (or functionalities) of the video encoder.

Moreover, it should be noted that any of the functional blocks described taking reference to FIG. 3 can be supplemented by any of the features, functionalities and details described within the present application in its entirety.

4). Further Embodiments and Details

In the following, further embodiments and details will be described which can be introduced, individually or in combination, into any of the embodiments disclosed herein, both individually and in combination. The details described herein may, for example, be introduced into the embodiments described taking reference to FIGS. 1 2, and 3, both individually and taken in combination.

In particular, it should be noted that the usage of one of the features, functionalities or details disclosed in this section typically already brings along an improvement, even though the usage of more than one feature, functionality or detail may create an even better embodiment.

Generally speaking, an aspect or embodiment of the invention creates a probability estimation method (or probability estimation concept) for binary arithmetic coding Introduction In the following, an introduction will be provided.

Context model update is a key feature of efficient binary arithmetic entropy coders by offering the possibility to adapt the internal state of the coder to the underlying source statistics. For example, each context model is equipped with an independent probability estimation stage which provides a probability for decoding or encoding the next binary symbol (bin) that is assigned to this context model.

While the probability stage implementation of the conventional video codec H.265/HEVC is based on a finite state machine (with 64 probability states in the range (0, 0.5]), the estimators described in this document are based on two counter variables that keep track of the source statistics of the assigned sequence of bins.

Each counter (which may, for example, implement the functionality of the source statistic value determinators 130, 140, 230, 240, 330, 340) is equipped with a window size w that determines to which extent the past number of binary symbols (for example, the previously encoded or previously decoded binary values, encoded or decoded using a context model for which the source statistic values are determined) influence the count (or, generally speaking, the value of the source statistic value). The update is derived, for example, by the so-called virtual sliding window approach. After a bin (or binary value) with the value $x_t$ is decoded or encoded the update of the counts $a_t$ and $b_t$ (which may be considered as source statistic values) can be implemented as described in the following. With Q=A, B:

$$Q_{t+1} = Q_t - \frac{Q_t}{w} + x_t. \tag{1}$$

If the update in equation (1) is using floating point arithmetic the counts will be in the interval (0, w) for all bin sequences. The output of the probability estimator $p_t$ is defined as:

$$p_t = \frac{\frac{A_t + B_t}{2}}{w}. \qquad (2)$$

Dependent on the arithmetic coding engine the output of the probability estimator may be used directly (for example, to determine range values for the arithmetic encoding/decoding core) or may involve further processing like mapping the value to the closest probability of a set of quantized probability values (or to one or more range values for an arithmetic encoding/decoding core).

Implementation Details

In the following, some implementation details will be described.

It is likely that implementations (for example, of the source statistic value determination blocks) involve the usage of integer arithmetic with a defined precision $BITS_q$ (wherein index q is a placeholder for indices a and b). Accordingly, integer-valued implementations, for example according to equations (3) and (5), or according to equation (5) may be used instead of the implementation of equation (1).

Furthermore, the set of possible window sizes may need to be limited to values that can be derived by $w_q = 2^{n_q}$ to allow a simplification of the arithmetic operations.

In this case (but also when $w_q$ is not equal to $2^{n_q}$ with an integer value of $n_q$) the update of the counts q=a, b can be calculated (equivalent to equation (1)) by:

$$q_{t+1} = q_t + (x_t \ll (BITS_q - n_q)) - (q_t \gg n_q). \qquad (3)$$

This update rule involves a clipping operation to be performed which guarantees that the counts remain in the valid range $(0, 2^{BITS_q})$ exclusively:

$$q_{t+1} = q_{t+1} - (q_{t+1} \gg BITS_q). \qquad (4)$$

If $w_q$ is not equal to $2^{n_q}$ with an integer value of $n_q$, the values $n_q$ may be chosen appropriately (for example, by rounding). Moreover, it should be noted that $x_t$ may represent a previously encoded binary value (having, for example, values 0 or 1) or a previously decoded binary value.

As an alternative, the equations (3) and (4) may be substituted by an update calculation that distinguishes between the value of the binary symbol:

$$q_{t+1} = \begin{cases} q_t + ((2^{BITS_q} - q_t) \gg n_q), & \text{if } x_t = 1 \\ q_t - (q_t \gg n_q), & \text{if } x_t = 0. \end{cases} \qquad (5)$$

Using different update rules for the different symbol values (as shown in the two lines of equation (5)) make the clipping operation of equation 4 obsolete.

Note, the two ways of implementing the virtual sliding window approach in equations (3) and (4) or equation (5) do not deliver identical bit streams due to the right-shift operation.

Also, it should be noted that the operations according to equations (3) and (4) or according to equation (5) may be performed by the source statistic value determinators described herein. However, the source statistic value determinators may also perform a different functionality (e.g. according to equation (1)) in some embodiments.

The probability estimator's output (for example, the combined source statistic value) is calculated by weighting the counters (for example, the source statistic values) that result from the update methods either from equation (4) or from equation (5) (or from another method):

$$\tilde{c}_t = (a_t + b_t) \gg 1. \qquad (6)$$

The weighted result $\tilde{c}_t$ from equation (6) (which may be considered as a combined source statistic value) can (optionally) be used to derive a probability $p_t$ (for example, by the value processing):

$$p_t = \frac{\tilde{c}_t}{2^{BITS_{res}}}, \qquad (7)$$

or an address index (for example pStateIdx) which is dependent on the design of the arithmetic coding engine.

The counter-based probability estimator may, for example, provide the probability for the next symbol with the value $x_{t+1} = 1$ of a binary sequence in the range (0,1). If a probability estimation for the next symbol with the value of $x_{t+1} = 0$ is needed, the output needs to be converted: $p(0) = 1 - p(1)$.

However, it should be noted that the computation of a probability value $p_t$ (or p(0) or p(1)) is not needed in all embodiments.

Unlike the counter-based probability estimators, the probability estimation of the finite state machine of H.265/HEVC is performed using a combination of two variables. The first variable pStateIdx stores a state index which represents the probability for the least probable symbol (LPS) in the range (0, 0.5]. The second variable valMPS contains the value of the most probable symbol (MPS). Likewise, the table with the pre-calculated range values for the interval subdivision of the binary arithmetic coder only covers the range (0, 0.5].

Thus, for example if a conventional mapping table or a mapping table having a conventional structure (like in a H.264 or H.265 video encoder or decoder) is to be used, it is recommendable to use a mapping if the (conventional) finite state machine is substituted with the counter-based probability estimator [3]. In other words, if the combined source statistic value is determined as described herein (for example, using equations (3) to (6), or using the similar equations mentioned below), it is recommendable (but not needed) to map the combined source statistic value onto an index value (e.g. pStateIdx) of a mapping table (for example, in the optional value processing). This allows to use a conventional mapping table. On the other hand, of the mapping table (providing the range values for the interval subdivision) is adapted appropriately, such a mapping may not be needed.

The mapping of the result $\tilde{c}_t$ from equation (6) (e.g. of the combined source statistic value) to the state index pStateIdx value may, for example, be calculated by (which may, for example, include a quantization down to a resolution of a mapping table):

$$pStateIdx = ((\tilde{c}_t - 2^{(BITS_{min}-1)}) \text{XOR} (valMPS-1)) \gg (BITS_{min} - BITS_{tabRes}), \qquad (8)$$

where $BITS_{tabRes}$ defines the number of bits used to represent LPS probability states of the table containing the pre-calculated values and valMPS is derived by $$valMPS = \tilde{c}_t \gg (BITS_{res} - 1). \qquad (9)$$

Instead of mapping the counter-based probability estimator result from equations (8) and (9) (or using equations (8) and (9)) to the representation of the LPS state index (e.g. to the representation of the less-probable-state state index or least-probable-state state index, for example pStateIdx) and the value of the MPS (e.g. the value of the more probable binary value, for example, valMPS), the arithmetic coding engine can be modified by two options alternatively.

Either the table containing the pre-calculated range values for the interval subdivision can be extended to cover the whole probability interval (0, 1) (such that, for example a table entry of the mapping table can directly be selected using the combined source statistic value or using the probability value $p_t$ (or p(0) or p(1))) or the table is omitted and the range values are calculated on the fly using arithmetic (for example, on the basis of the combined source statistic value or on the basis of the probability value pt or p(0) or p(1)).

In other words, there are numerous different ways to derive the range value for the interval subdivision in the arithmetic decoding core on the basis of the combined source statistic value. A computation according to equations (8) and (9) is recommendable, if a conventional mapping table is to be used. Alternatively, the computations according to equations (8) and (9) can be omitted if a modified mapping table is used or if the range values are derived from the combined source statistic value using some computation rule.

Invention Aspect—Variable Resolution of the Counter Variables

In the following, an aspect of the invention will be described, which can optionally be used in any embodiments according to the present invention.

Conventional integer implementations of the counter-based probability estimator use the same number of bits to represent the counter's precision $BITS_q = BITS_a = BITS_b$.

It has been found that, to optimize the trade-off between memory consumption and coding efficiency the $BITS_q$ variables can be dimensioned depending on the window size (or can be dynamically adapted according to the currently used window size).

Therefore, the counter variables (for example, the source statistic values) may, for example, be modified before the weighting operation from equation (6) (for example, the source statistic value combination) is applied:

$$q'_t = a_t >> (BITS_q - BITS_{min}), \quad (10)$$

where $BITS_{min} = \min(BITS_a, BITS_b)$.

With q'=a', b' the weighting operation (for example, the source statistic value combination) is modified to $$\widetilde{c}_t = (a'_t + b'_t) >> 1. \quad (11)$$

The mapping of the result $\widetilde{c}_t$ to the state index pStateIdx value from equations (8) and (9) (which may be performed by the optional value processing) may be modified to $$p\text{StateIdx} = ((\widetilde{c}_t - 2^{(BITS_{min}-1)}) \text{XOR}(valMPS-1)) >> (BITS_{min} - BITS_{tabRes}), \quad (12)$$

with valMPS derived by $$valMPS = \widetilde{c}_t >> (BITS_{min} - 1). \quad (13)$$

If the table containing the pre-calculated range values for the interval subdivision is extended to cover the whole probability interval (0, 1), the state index may derived (for example, by the optional value processing) as follow (for example instead of the computations of equations (12) and (13):

$$p\text{StateIdx} = \widetilde{c}_t >> (BITS_{min} - BITS_{tabRes}) \cdot ef \quad (14)$$

Invention Aspect: Slice Type, Cabac Init Flag and Context Model Dependent Window Sizes In the following, possibilities for the adjustment of the window size will be described, which may optionally be used in any of the embodiments of the invention.

The update of the counter variables Q,q=a, b in equations (1), (3) and (5) all contain the window size w(e.g. $w_a$ or $w_b$), or the exponent n (e.g. $n_a$ or $n_b$) which is defined as $n=\log_2 w$, to control the number of past bins that influence the output of the probability estimator (e.g. of the source statistic value determinator).

In previous publications [1] the window size was set to the same two values for all context models, e.g. $n_a=4$ and $n_b=8$, independent of any other parameters of the video codec.

According to an aspect of the present invention the window size pair for each context model is set to custom values for n (for example, for $n_a$ and/or $n_b$) in the range [1,11], inclusively, dependent on the context model, the cabac init flag and the slice type.

The cabac init flag is part of the H.265/HEVC and is referred to as "cabac_init_flag" [2].

There are three slice types defined and they are usually referred to as B-, P- or Intra-predicted slice. For example, in an analogous manner to the "initValue" of [2], which is used to derive the initial probability state, a pair of window sizes $ws_{pair}$ (for example, defining $w_a$ and $w_b$ or $n_a$ and $n_b$) is defined for all combinations of slice type and "cabac_init_flag" for each context model (for example in a predefined table).

In implementations using integer arithmetic, the window size values (for example, $n_a$ and $n_b$) for one context model can, for example, be stored in a read only memory as an 8-bit variable, with $n_a$ stored in the most significant nibble and $n_b$ stored at the least significant nibble:

$$ws_{pair} = (n_a << 4) + n_b. \quad (15)$$

The resulting structure of the $ws_{pair}$ is depicted in Table 1, shown in FIG. 7A.

Note, the structure of the $ws_{pair}$ variable as shown in FIG. 7A is an example of a generous layout for software implementations, where memory requirements are not critical. The number of bits used to store $n_a$ and $n_b$ is capable of storing more combinations than needed.

An example of the derivation process for the correct $ws_{pair}$ of one context model (which may be performed by the control block) is depicted in Table 2, as shown in FIG. 7B.

For example, it can be seen that there are three pre-defined values of $ws_{pair}$, which are designated by $ws_{pair0}, ws_{pair1}$ and $ws_{pair2}$.

One of these pre-defined values of wspair is selected (for example by the control block) on the basis of the "Slice Type" information and on the basis of a so-called "cabac init flag" (which may optionally also determine initialization values for the source statistic values and/or for other variables of the vide encoder or video decoder). For example, if the slice type is bi-predictive ("B"), the "cabac init flag" may decide which of the two pre-defined values $ws_{pair0}$ and $ws_{pair1}$ is actually used to determine $n_a$ and $n_b$ (or $w_a$ and $w_b$). Similarly, if the slice type is single-predictive ("P"), the "cabac init flag" may decide which of the two pre-defined values $ws_{pair0}$ and $ws_{pair1}$ is actually used to determine $n_a$ and $n_b$ (or $w_a$ and $w_b$) (wherein an opposite allocation between the value of the cabac init flag and the pre-defined values $ws_{pair0}$ and $ws_{pair1}$ may be used when compared to the case of the bi-predictive slice type. If the slice is encoded using an independent coding mode ("Intra"), the cabac init flag may be inactive, and the pre-defined value $ws_{pair2}$ may be used.

It should also be noted that the table 2 represents only one context model, and that different tables may be available for different context models (wherein, for example, the whole process of range value determination may work independently for different context models).

A context model should be initialized with the intended window sizes before decoding or encoding the first bin. The initialization process shall be performed at the same time when the initial probability state/count of each context model is set.

Embodiments

In the following, embodiments and further aspects will be described. The embodiments mentioned in this section can be used individually, and can optionally be supplemented by and of the features, functionalities and details described herein.

Also, it should be noted that all the video decoders and video encoders disclosed herein can optionally be supplemented by any of the features, functionalities and details described in the following, either individually or in combination. Also, features of the video decoders and video encoders described herein can optionally be replaced by any of the features, functionalities and details described in the following.

(a) In an embodiment of this invention, each context model is equipped with two counter variables $q_t=a_t, b_t$. During the initialization of a slice (for example, of a part of a video frame), the window size variables $n_q$ are, for example, set to specific values dependent on the current slice type and the value of the cabac init flag, for example as as outlined in Table 2 and the counters' resolution variables (or the resolution variables of the source statistic values) are, for example, set to the same value $BITS_q=BITS_a=BITS_b$ (optional). For encoding or decoding a bin (for example, a binary value), that is assigned to this context model, the count is weighted, for example, as in equation (11) and used to derive a state index, for example, as defined by equations (12) and (13). After a bin (for example a binary value) is encoded or decoded the counter variables (or source statistic values) are updated, for example, as specified by equation (5) using the specified custom window size (for example, as defined by $n_a$ and $n_b$) for each counter (or for each source statistic value).

(b) In another embodiment of this invention the probability estimation method (or concept) is configured identical to embodiment (a) but the update of the counter variables (or source statistic values) is performed using equations (3) and (4).

(c) In another embodiment of this invention the probability estimation method (or concept) is configured identical to embodiment (a) but equation (14) is used to derive a state index. The state index addresses a table (for example, a mapping table for providing range values) with pre-calculated range values that cover the whole probability interval (0,1).

(d) In another embodiment of this invention the probability estimator (for example, the source statistic value determination blocks) is configured as specified in embodiment (a) but the individual counters of a context model (or the two source statistic values of the respective context model) are not equally weighted as in equation (11). Instead the weighting operation includes the weights of the individual counters $\beta_q=\beta_a,\beta_b$:

$$\tilde{c}_t=((a'_t*\beta_a)+(b'_t*\beta_b)), \quad (16)$$

for example, for $\beta_a+\beta_b=1$. In this embodiment the operation of equation (11) is replaced by equation (16) or an alternative integer weighting implementation.

(e) In another embodiment of this invention the probability estimation method (for example, the source statistic value determination blocks) is configured as in embodiment (d) but the weights of the individual counters (for example, of the two source statistic values) are altered during the encoding or decoding process.

(f) In another embodiment, the probability estimator (or the source statistic value determination blocks) is configured identical to embodiment (a), but the set of available window sizes is limited to a smaller subset to reduce memory requirements used to store the $ws_{pair}$ variables (for example, by adapting the control block). Here, $n_b$ may not be smaller than $n_a$, which for the allowed range [1,11] results in 66 valid combinations. Consequently, the number of bits used by the $ws_{pair}$ variable can be reduced to a more compact layout as outlined in Table 1—Bitmask of 8-bit variable $ws_{pair}$.

(g) In another embodiment, the probability estimator (or the source statistic value determination blocks) is configured as specified by embodiment (f), but the number of valid combinations is reduced by omitting hand-selected $ws_{pair}$ variables (for example, by adapting the control block).

(h) In another embodiment, the probability estimator (or the source statistic value determination blocks) is configured as specified by embodiment (f), but the number of valid combinations is reduced to $ws_{pair}$ variables, where the difference between $n_b$ and $n_a$ is at least 3 ($n_b-n_a\leq3$) (for example, by adapting the control block).

(i) In another embodiment, the probability estimator (or the source statistic value determination blocks) is configured as specified by embodiment (h), but the set of valid window size combinations is extended with $ws_{pair}$ variables, where $n_b$ and $n_a$ are equal ($n_b=n_a$) (for example, by adapting the control block).

(j) In another embodiment of this invention the probability estimation method or concept (or the source statistic value determination blocks) is configured as in embodiment (a) but the counters' resolutions (or the resolution of the source statistic values) are not equal: e.g. $BITS_a\neq BITS_b$ (for example, by adapting the control block, or by adapting the source statistic value determination blocks). Especially for counters (or for source statistic values) that use smaller window sizes, e.g. $n=\log_2 w \leq 5$, the resolution of the individual counters (or source statistic value) can be decreased to reduce memory consumption.

(k) In another embodiment of this invention the probability estimation method opr concept is configured as in embodiment (j), but the resolution of a counter (or of a source statistic value) $BITS_q$ is derived by its window size (for example, by the window size used to compute or update the source statistic value): e.g. $BITS_q=ThrHd+n_q$, where ThrHd is a threshold value (for example, a fixed value) and can, for example, be equal to 8.

(l) In another embodiment of this invention the probability estimation method or concept is configured as in embodiment (j), but the sum of the $BITS_q$ variables of one context model is equal for all context models (which may, for example, be achieved by an adaptation of the control block). Thus, each context model needs the same number of bits and addressing specific context models can be performed by a simple offset calculation (for example, if the source statistic values associated with different context models are stored in an array or in a contiguous memory region).

(m) In another embodiment the probability estimator (for example, the source statistic value determination blocks) is configured as described in embodiment (l), but the number of valid window size combinations is reduced (for example, by an adaptation of the control block), because of the constraint that the sum of the $BITS_q$ variables is equal for all context models. In this embodiment the cases where $n_b$ and $n_a$ are equal ($n_b=n_a$) are excluded from the reduction (such that, for example, cases where $n_a$ and $n_b$ are equal can still be selected).

(n) In another embodiment the probability estimator (for example, the source statistic value determination blocks) is configured as described in embodiment (a) but the window size of one counter is set to infinite. Thus, the count is never updated and the complexity can be reduced in terms of arithmetic operations and memory consumption. For example, one of the source statistic values can be replaced by a fixed value. Accordingly, the combined source statistic value can be obtained by combination of one of the source statistic values with said fixed value.

(o) In another embodiment the probability estimator (for example, the source statistic value determination blocks) is configured as described in embodiment (a) but the context models are initialized dependent on a separate flag that is transmitted for each slice (for example, provided by a video encoder and evaluated by a video decoder). Instead of initializing the window sizes dependent on the slice type and the cabac init flag, a separate flag "ws_flag" is introduced which specifies the set used (for example, the values of $n_a$ and $n_b$ used). As a result, the assignment of Table 2 is extended as shown in FIG. 7C Table 3.

For example, for each slice type, it is possible to choose between two sets of window sizes in dependence on the "ws_flag" flag or parameter which is included in the video bitstream (for example as a control information or configuration information).

Thus, the control block (or generally, the video encoder or the video decoder) may, for example, evaluate the ws flag and adjust the window sizes in dependence on the ws flag (and typically also in dependence on the slice type parameter, which is typically also included in the video bitstream as a control information or configuration information, for example, for each slice or for selected slices).

(p) In another embodiment the probability estimator (for example, the source statistic value determination blocks) is configured as described in embodiment (a) but the initialization of window sizes is additionally dependent on the temporal level of the current slice. As a result, the total number of $ws_{pair}$ variables is increased. Thus, the control block (or the video encoder or decoder) may, for example, be configured to consider the temporal level of the current slice when determining the window sizes.

(q) In another embodiment the probability estimator (for example, the source statistic value determination blocks) is configured as described in embodiment (a) but the initialization of window sizes is additionally dependent on the quantization parameter of the current slice. Thus, the control block (or the video encoder or decoder) may, for example, be configured to consider the quantization parameter of the current slice when determining the window sizes.

(r) In another embodiment the probability estimator (for example, the source statistic value determination blocks) is configured as described in embodiment (p) but the initialization is additionally dependent on the quantization parameter. As result a $ws_{pair}$ variable is specified for each item of the product space of temporal level, quantization parameter, slice type and cabac init flag. Thus, the control block (or the video encoder or decoder) may, for example, be configured to consider the temporal level and the quantization parameter of the current slice when determining the window sizes.

(s) In another embodiment of this invention the probability estimation method or concept (for example, the source statistic value determination blocks) is configured identical to embodiment (a) but the window size variables are altered during the decoding or encoding process (for example, within a slice and/or between different slices and/or between different frames), dependent on the position.

E.g. if the current bin originates from a CTU (coding tree unit) that is part of the first column or first row of a slice, the window sizes (for example, $n_a$ and $n_b$) of both counters (or source statistic value determinators) is set to:

$$n_{q\,fast\,attack} = \begin{cases} n_q - 1, & \text{if } n_q > 1 \\ n_q, & \text{else} \end{cases} \quad (17)$$

For example, this may mean a selective reduction of the window size if the current bin originates from a CTUI that is part of the first row or of the first column of a slice.

If the coding process of the first row of CTUs or the first column of CTUs is finished the window sizes are set to their default values (for example, as defined on the basis of the slice type and any other parameters or flags which may be considered, for example, according to one of tables 2 and 3).

By altering the window sizes, the probability estimator may adapt faster or slower to the underlying statistics of the source bin sequence in the beginning of a slice or a row of CTUs.

(t) In another embodiment of this invention the probability estimation method or concept (for example, the source statistic value determination blocks) is configured identical to embodiment (a) but an additional flag is used (for example, provided by a video encoder and evaluated by a video decoder) to alter the window size during decoding or encoding of a slice. In this embodiment there is a flag "ctu_ws_flag", for example, for every CTU which is used to increase or decrease the $n_a$ and $n_b$ variables for all context models or a subset (for example, of the context models). During encoding the "ctu_ws_flag" is signalled, for example, before every CTU and during decoding the "ctu_ws_flag" is read, for example, before every CTU. Dependent on value of "ctu_ws_flag", the $n_a$ and $n_b$ variables of all context models are increased or decreased by one if the result is still in the valid range [1,11].

(u) In another embodiment of this invention the probability estimation method or concept (for example, the source statistic value determination blocks) is configured identical to embodiment (t) but only the window sizes of a subset of all context models are altered, dependent on the ctu_ws_flag.

5). Method According to FIG. 4

FIG. 4 shows a flowchart of a method 400, according to an embodiment of the invention.

It should be noted that the method 400 can optionally be supplemented by any of the features, functionalities and details described herein with respect to the corresponding apparatus, both individually and taken in combination.

It should also be noted that it is not needed to compute the second source statistic value if the combined source statistic value is obtained by combining the first source statistic value with a fixed non-zero value.

6). Method According to FIG. 5

FIG. 5 shows a flowchart of a method 500, according to an embodiment of the invention.

It should be noted that the method 500 can optionally be supplemented by any of the features, functionalities and details described herein with respect to the corresponding apparatus, both individually and taken in combination.

It should also be noted that it is not needed to compute the second source statistic value if the combined source statistic value is obtained by combining the first source statistic value with a fixed non-zero value.

7). Video Stream According to FIG. 6

Figure 6:
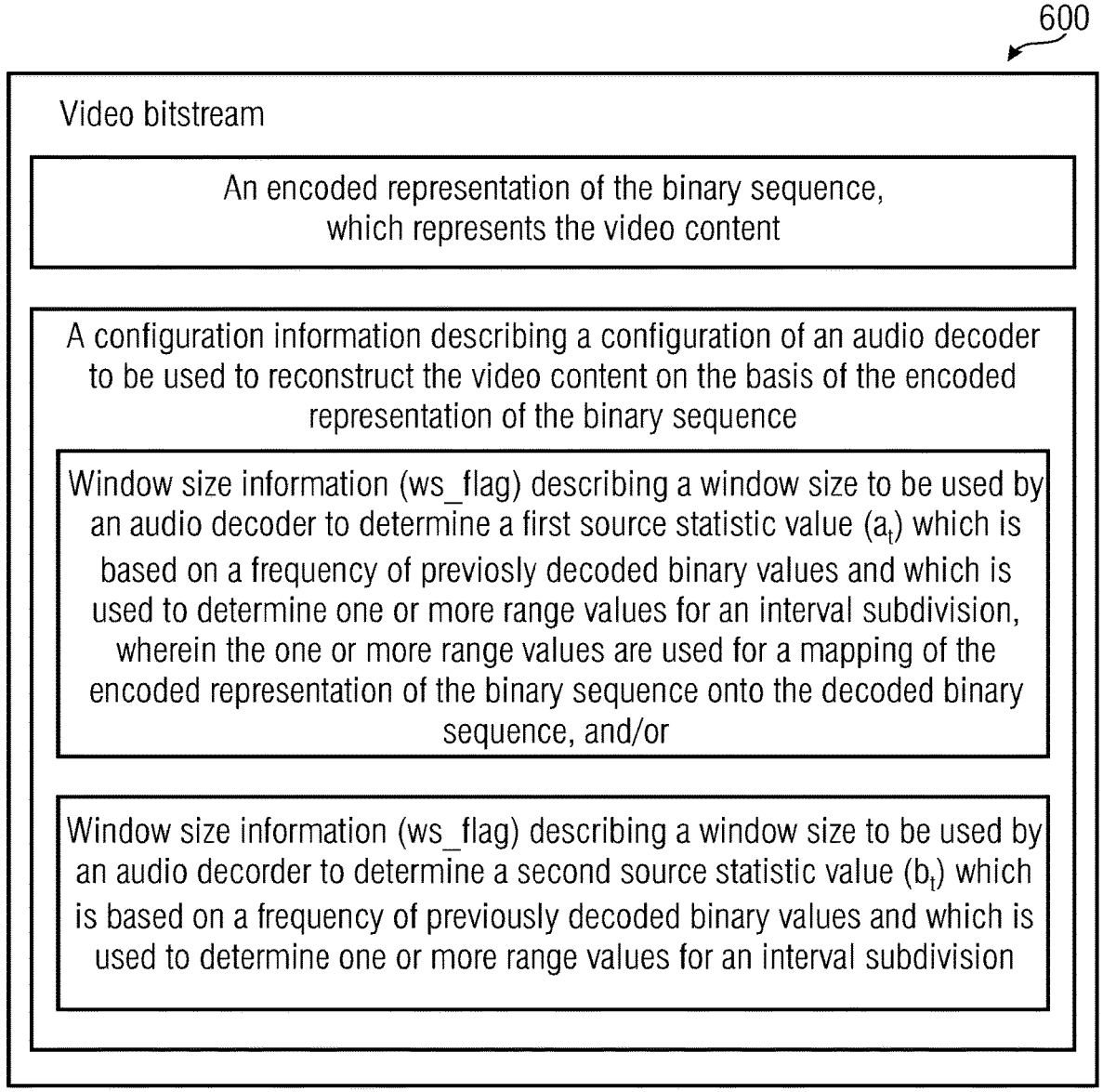
FIG. 6 shows a graphic representation of a bit stream, according to an embodiment of the invention.

FIG. 6 shows a schematic (simplified) representation of a video stream (bitstream), according to an embodiment of the present invention.

It should be noted that the video stream 600 can optionally be supplemented by any of the features and details described herein, both individually and taken in combination.

8). Conclusions

To conclude, embodiments of a probability estimation method and apparatus for binary arithmetic coding have been described, which can be used, for example, in video encoders, video decoders but also in image encoders, image decoders, audio encoders, audio decoders and the like.

These methods and apparatus outperform conventional solutions.

For example, document in [4] describes custom window sizes defined for each context model. However, the window sizes are not derived dependent on the slice type or the cabac init flag. Two pairs of window sizes are defined for each context model and the quantization parameter is used to select one pair. Furthermore, a different range of window sizes is provided.

The document in [5] describes a method which can be compared as an alternative to the fast attack mode described in claim (s). The document describes that an additional pair of window sizes is defined for the first 64 bins assigned the context model. After the first 64 bins are decoded or encoded the window size are set to their default value. This approach involves a separate counter variable which tracks the number of bins coded for each context model.

9). Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded video signal (or video stream or video bitstream) can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] A. Alshin, E. Alshina, "Multi-parameter probability update for CABAC", JCTVC-F254, Torino, July, 2011, http://phenix,it-sudparis.eu/jct/doc_end_user/documents/6_Torino/wg11/JCTVC-F254-v5.zip.

[2] ITU-T, Recommendation H.265(12/16), https://www.itu.int/rec/dologin_pub.asp?lang=e&id=T-REC-H.285-201612-HPDF-E&type=items.

[3] J. Stegemann, H. Kirchhoffer, D. Marpe, T. Wiegand, "Non-CE1: Counter-based probability model update with adapted arithmetic coding engine", http://phenix.it-sudparis.eu/jct/doc_end_user/documents/7_Geneva/wg11/JCTVC-G547-v4.zip.

[4] A. Said, M. Karczewicz, V. Seregin, H. Egilmez, L. Zhang, X. Zhao, "EE2: Arithmetic coding with context-dependent double-window adaptation response", JVET-H0061, http://phenix.it-sudparis.eu/jvet/doc_end_user/documents/8_Macau/wg11/JVET-H0061-v1.zip

[5] A. Said, M. Karczewicz, V. Seregin, H. Egilmez, L. Zhang, X. Zhao, "EE2 related: Arithmetic coding with progressive context-dependent double-window adaptation response", http://phenix.it-suparis.eu/jyet.doc_end_user/documents/8_Macau/wg11/JVET-H0067-v2.zip

The invention claimed is:

1. A video decoder comprising at least one processor and memory, the memory comprising instructions which, when executed by the at least one processor, cause the video decoder to:
   decode video content based on arithmetically decoding an encoded representation of a binary sequence;
   acquire a first source statistic value, $a_{t+1}$, according to:

$$a_{t+1}=a_t+x_t\cdot(ONE_a>>n_a)-(a_t>>n_a),$$

wherein $x_t$ is a decoded binary value,
   $a_t$ is a previous version of the first source statistic value,
   $n_a$ is a first window size parameter, $$ONE_a=(1<<BITS_a)-1, \text{ and}$$

$BITS_a$ is a number of bits used to represent the first source statistic value;
   acquire a second source statistic value, $b_{t+1}$, according to:

$$b_{t+1}=b_t+x_t\cdot(ONE_b>>n_b)-(b_t>>n_b),$$

wherein $x_t$ is the decoded binary value,
   $b_t$ is a previous version of the second source statistic value,
   $n_b$ is a second window size parameter, $$ONE_b=(1<<BITS_b)-1, \text{ and}$$

$BITS_b$ is a number of bits used to represent the second source statistic value;
   determine a combined source statistic value based on the first source statistic value and the second source statistic value;
   determine one or more range values for an interval subdivision based on the combined source statistic value; and
   map the encoded representation of the binary sequence to the binary sequence using the one or more range values.

2. The video decoder according to claim 1, wherein the memory further comprises instructions which, when executed by the processor, cause the video decoder to:
   evaluate slice type information indicating whether a slice is type I, P, or B; and
   determine the first window size parameter and the second window size parameter based on the slice type information.

3. The video decoder according to claim 1, wherein the combined source statistic value is determined by combining the first source statistic value and the second source statistic value.

4. The video decoder according to claim 3, wherein different weights for combining are associated with the first source statistic value and the second source statistic value.

5. The video decoder according to claim 1, wherein $BITS_a$ is different from $BITS_b$.

6. The video decoder according to claim 5, wherein the first window size parameter is different from the second window size parameter, and wherein a comparatively larger number of bits are used for a representation of a source statistic value comprising a comparatively larger window size parameter and a comparatively smaller number of bits are used for a representation of a source statistic value comprising a comparatively smaller window size parameter.

7. The video decoder according to claim 1, wherein the memory further comprises instructions which, when executed by the processor, cause the video decoder to:

determine a state index based on the combined source statistic value;

determine a value representing a most probable binary value based on the state index; and determine the one or more range values for the interval subdivision based on the the state index.

8. The video decoder according to claim 1, wherein the memory further comprises instructions which, when executed by the processor, cause the video decoder to:

select the first window size parameter, $n_a$, and the second window size parameter, $n_b$, so that $|n_a-n_b| \geq 3$.

9. The video decoder according to claim 1, wherein the memory further comprises instructions which, when executed by the processor, cause the video decoder to:

determine the first window size parameter, $n_a$, and the second window size parameter, $n_b$, based on a context model.

10. A method of video decoding, the method comprising:

decoding video content based on arithmetically decoding an encoded representation of a binary sequence;

acquiring a first source statistic value, $a_{t+1}$, according to:

$$a_{t+1}=a_t+x_t \cdot (ONE_a >> n_a)-(a_t >> n_a),$$

wherein $x_t$ is a decoded binary value, $a_t$ is a previous version of the first source statistic value, $n_a$ is a first window size parameter, $$ONE_a = (1 << BITS_a) - 1, \text{ and}$$

$BITS_a$ is a number of bits used to represent the first source statistic value;

acquiring a second source statistic value, $b_{t+1}$, according to:

$$b_{t+1}=b_t+x_t \cdot (ONE_b >> n_b)-(b_t >> n_b),$$

wherein $x_t$ is the decoded binary value, $b_t$ is a previous version of the second source statistic value, $n_b$ is a second window size parameter, $$ONE_b = (1 << BITS_b) - 1, \text{ and}$$

$BITS_b$ is a number of bits used to represent the second source statistic value;

determining a combined source statistic value based on the first source statistic value and the second source statistic value;

determining one or more range values for an interval subdivision based on the combined source statistic value; and mapping the encoded representation of the binary sequence to the binary sequence using the one or more range values.

11. The method according to claim 10, further comprising:

evaluating slice type information indicating whether a slice is type I, P, or B; and determining the first window size parameter and the second window size parameter based on the slice type information.

12. The method according to claim 10, further comprising:

determining a state index based on the combined source statistic value;

determining a value representing a most probable binary value based on the state index; and determining the one or more range values for the interval subdivision based on the state index.

13. The method according to claim 10, further comprising:

selecting the first window size parameter, $n_a$, and the second window size parameter, $n_b$, so that $|n_a-n_b| \geq 3$.

14. The method according to claim 10, further comprising:

determining the first window size parameter, $n_a$, and the second window size parameter, $n_b$, based on a context model.

15. A non-transitory digital storage medium having a computer program stored thereon to perform, when the computer program is run by a computer, a method of video decoding, the method comprising:

decoding video content based on arithmetically decoding an encoded representation of a binary sequence;

acquiring a first source statistic value, $a_{t+1}$, according to:

$$a_{t+1}=a_t+x_t \cdot (ONE_a >> n_a)-(a_t >> n_a),$$

wherein $x_t$ is a decoded binary value, $a_t$ is a previous version of the first source statistic value, $n_a$ is a first window size parameter, $$ONE_a = (1 << BITS_a) - 1, \text{ and}$$

$BITS_a$ is a number of bits used to represent the first source statistic value;

acquiring a second source statistic value, $b_{t+1}$, according to:

$$b_{t+1}=b_t+x_t \cdot (ONE_b >> n_b)-(b_t >> n_b),$$

wherein $x_t$ is the decoded binary value, $b_t$ is a previous version of the second source statistic value, $n_b$ is a second window size parameter, $$ONE_b = (1 << BITS_b) - 1, \text{ and}$$

$BITS_b$ is a number of bits used to represent the second source statistic value;

determining a combined source statistic value based on the first source statistic value and the second source statistic value;

determining one or more range values for an interval subdivision based on the combined source statistic value; and mapping the encoded representation of the binary sequence to the binary sequence based on the one or more range values.

16. A video encoder, comprising at least one processor and memory, the memory comprising instructions which, when executed by the at least one processor, cause the video encoder to:

encode video content based on arithmetically encoding a binary sequence to create an encoded representation of the binary sequence;

acquire a first source statistic value, $a_{t+1}$, according to:

$$a_{t+1}=a_t+x_t \cdot (ONE_a >> n_a)-(a_t >> n_a),$$

wherein $x_t$ is a decoded binary value, $a_t$ is a previous version of the first source statistic value, $n_a$ is a first window size parameter, $$ONE_a = (1 << BITS_a) - 1, \text{ and}$$

$BITS_a$ is a number of bits used to represent the first source statistic value;

acquire a second source statistic value, $b_{t+1}$, according to:

$$b_{t+1}=b_t+x_t \cdot (ONE_b >> n_b)-(b_t >> n_b),$$

wherein $x_t$ is the decoded binary value, $b_t$ is a previous version of the second source statistic value, $n_b$ is a second window size parameter, $$ONE_b=(1<<BITS_b)-1, \text{ and}$$

$BITS_b$ is a number of bits used to represent the second source statistic value;

determine a combined source statistic value based on the first source statistic value and the second source statistic value;

determine one or more range values for an interval subdivision based on the combined source statistic value; and map the binary sequence to the encoded representation of the binary sequence based on the one or more range values.

17. The video encoder according to claim 16, wherein the memory further comprises instructions which, when executed by the processor, cause the video encoder to:

encode slice type information indicating whether a slice is type I, P, or B; and determine the first window size parameter and the second window size parameter based on the slice type information.

18. The video encoder according to claim 16, wherein the combined source statistic value is determined by combining the first source statistic value and the second source statistic value.

19. The video encoder according to claim 18, wherein different weights for combining are associated with the first source statistic value and the second source statistic value.

20. The video encoder according to claim 16, wherein $BITS_a$ is different from $BITS_b$.

21. The video encoder according to claim 20, wherein the first window size parameter is different from the second window size parameter, and wherein a comparatively larger number of bits are used for a representation of a source statistic value comprising a comparatively larger window size parameter and a comparatively smaller number of bits are used for a representation of a source statistic value comprising a comparatively smaller window size parameter.

22. The video encoder according to claim 16, wherein the memory further comprises instructions which, when executed by the processor, cause the video encoder to:

determine a state index based on the combined source statistic value;

determine a value representing a most probable binary value based on the state index; and determine the one or more range values for the interval subdivision based on the state index.

23. The video encoder according to claim 16, wherein the memory further comprises instructions which, when executed by the processor, cause the video encoder to:

select the first window size parameter, $n_a$, and the second window size parameter, $n_b$, so that $|n_a-n_b|\geq 3$.

24. The video encoder according to claim 16, wherein the memory further comprises instructions which, when executed by the processor, cause the video decoder to:

determine the first window size parameter, $n_a$, and the second window size parameter, $n_b$, based on a context model.

25. A method of video encoding, the method comprising:

encoding video content based on arithmetically encoding a binary sequence to create an encoded representation of the binary sequence;

acquiring a first source statistic value, $a_{t+1}$, according to:

$$a_{t+1}=a_t+x_t(ONE_a>>n_a)-(a_t>>n_a),$$

wherein $x_t$ is a decoded binary value, $a_t$ is a previously computed version of the first source statistic value, $n_a$ is a first window size parameter, $$ONE_a=(1<<BITS_a)-1, \text{ and}$$

$BITS_a$ is a number of bits used to represent the first source statistic value;

acquiring a second source statistic value, $b_{t+1}$, according to:

$$b_{t+1}=b_t+x_t(ONE_b>>n_b)-(b_t>>n_b),$$

wherein $x_t$ is the decoded binary value, $b_t$ is a previous version of the second source statistic value, $n_b$ is a second window size parameter, $$ONE_b=(1<<BITS_b)-1, \text{ and}$$

$BITS_b$ is a number of bits used to represent the second source statistic value;

determining a combined source statistic value based on the first source statistic value and the second source statistic value;

determining one or more range values for an interval subdivision based on the combined source statistic value; and mapping the binary sequence to the encoded representation of the binary sequence using the one or more range values.

26. The method according to claim 25, further comprising:

encoding slice type information indicating whether a slice is type I, P, or B; and determining the first window size parameter and the second window size parameter based on the slice type information.

27. The method according to claim 25, further comprising:

determining a state index based on the combined source statistic value;

determining a value representing a most probable binary value based on the state index; and determining the one or more range values for the interval subdivision based on the state index.

28. The method according to claim 25, further comprising:

selecting the first window size parameter, $n_a$, and the second window size parameter, $n_b$, so that $|n_a-n_b|\geq 3$.

29. The method according to claim 25, further comprising:

determining the first window size parameter, $n_a$, and the second window size parameter, $n_b$, based on a context model.

30. A non-transitory digital storage medium having a computer program stored thereon to perform, when the computer program is run by a computer, a method of video encoding, the method comprising:

encoding video content based on arithmetically encoding a binary sequence to create an encoded representation of the binary sequence;

acquiring a first source statistic value, $a_{t+1}$, according to:

$$a_{t+1}=a_t+x_t(ONE_a>>n_a)-(a_t>>n_a),$$

wherein $x_t$ is a decoded binary value, $a_t$ is a previous version of the first source statistic value, $n_a$ is a first window size parameter, $ONE_a = (1 << BITS_a) - 1$, and $BITS_a$ is a number of bits used to represent the first source statistic value;

acquiring a second source statistic value, $b_{t+1}$, according to:

$$b_{t+1} = b_t + x_t \cdot (ONE_b >> n_b) - (b_t >> n_b),$$

wherein $x_t$ is the decoded binary value, $b_t$ is a previous version of the second source statistic value, $n_b$ is a second window size parameter, $ONE_b = (1 << BITS_b) - 1$, and $BITS_b$ is a number of bits used to represent the second source statistic value;

determining a combined source statistic value based on the first source statistic value and the second source statistic value;

determining one or more range values for an interval subdivision based on the combined source statistic value; and mapping the binary sequence to the encoded representation of the binary sequence using the one or more range values.

* * * * *